(12) United States Patent
Hunt et al.

(10) Patent No.: US 11,176,901 B1
(45) Date of Patent: Nov. 16, 2021

(54) PAN-WARPING AND MODIFYING SUB-FRAMES WITH AN UP-SAMPLED FRAME RATE

(71) Applicant: Facebook Technologies, LLC, Menlo Park, CA (US)

(72) Inventors: Warren Andrew Hunt, Woodinville, WA (US); William Thomas Blank, Bellevue, WA (US); Ilias Pappas, Cork (IE); Michael Yee, Kirkland, WA (US); Edward Buckley, Redmond, WA (US)

(73) Assignee: Facebook Technologies, LLC., Menlo Park, CA (US)

( * ) Notice: Subject to any disclaimer, the term of this patent is extended or adjusted under 35 U.S.C. 154(b) by 156 days.

(21) Appl. No.: 16/539,737

(22) Filed: Aug. 13, 2019

(51) Int. Cl.
  *G09G 3/36* (2006.01)
  *G06T 3/00* (2006.01)
  *G09G 3/20* (2006.01)

(52) U.S. Cl.
  CPC ......... *G09G 3/3618* (2013.01); *G06T 3/0093* (2013.01); *G09G 3/2029* (2013.01); *G09G 2310/0202* (2013.01); *G09G 2340/0435* (2013.01)

(58) Field of Classification Search
  CPC ............... G09G 3/2022; G09G 3/2029; G09G 2340/0435; G02B 27/0172
  See application file for complete search history.

(56) References Cited

U.S. PATENT DOCUMENTS

| | | | |
|---|---|---|---|
| 2008/0165280 A1* | 7/2008 | Deever | H04N 7/0132 348/497 |
| 2015/0287354 A1* | 10/2015 | Wang | G09G 3/2003 345/598 |
| 2015/0379772 A1* | 12/2015 | Hoffman | G06T 19/006 345/633 |
| 2016/0116745 A1* | 4/2016 | Osterhout | G02B 27/0172 359/614 |
| 2018/0053284 A1* | 2/2018 | Rodriguez | G06F 3/14 |
| 2018/0184042 A1* | 6/2018 | Matsuda | H04N 7/0132 |

* cited by examiner

*Primary Examiner* — Priyank J Shah
(74) *Attorney, Agent, or Firm* — Baker Botts L.L.P.

(57) ABSTRACT

In an embodiment, a method includes accessing a first rendered frame generated based on a first viewing direction of a user. The first rendered frame may be generated at a first frame rate. The method includes generating, based on the first rendered frame, one or more sub-frames at a second frame rate that is higher than the first frame rate. A first sub-frame of the one or more sub-frames is generated by determining a second viewing direction of the user based on sensor data and applying one or more transformations to the first frame based on the second viewing direction. The method includes outputting the one or more sub-frames for display at the second frame rate.

20 Claims, 8 Drawing Sheets

PAN-WARPING AND MODIFYING SUB-FRAMES WITH AN UP-SAMPLED FRAME RATE

TECHNICAL FIELD

This disclosure generally relates to displaying images on an electronic display.

BACKGROUND

Use of portable displays has increased dramatically, increasing demand for lightweight and power efficient displays. However, some such displays may sacrifice clarity or frame rate to allow for reduced power requirements, and, in the case of body-carried displays, more comfortable wear. However, user experience often suffers because of these sacrifices. Displays may reduce brightness, or lower resolution, color depth, or maximum display frame rate, which reduces the appeal of using such a display. Displays with low frame rates may not even be practical for certain applications. Particularly in scenarios where the display is used to provide an artificial reality experience to the user, display quality impacts the perception of the quality of the experience itself. Further complicating the issue is the high computing cost required to render and support high quality user experiences.

SUMMARY OF PARTICULAR EMBODIMENTS

In particular embodiments, a display may operate by pulsing an image to a user at a high frame rate (e.g., 100-200 Hz). Each frame may be displayed for a particular time interval and then removed from display. Unfortunately, visual artifacts may be created during the time the frame is displayed based on a difference between the user's position when the frame was first rendered and the time when the frame is shown on the display. To eliminate visual artifacts, the display may be configured to up-sample the frame rate, for example to 10 kHz. Thus, for every frame provided to the display, it may generate dozens of sub-frames. The extremely high frame rate may cause the image perceived by the user to be the average of many sub-frames, rather than a single frame. This may allow for light emitting sources to be used in the display that have a reduced maximum brightness, without sacrificing perceived image sharpness and color fidelity, by increasing the on-time for each source. Thus, a display may be used in a more power efficient manner (e.g., emitting less bright light) with less expensive components, as explained below. The high up-sampled frame rate also allows for unique image correction techniques.

In particular embodiments, the position of each sub-frame may be adjusted based on minute changes in the position of a user's head or eyes. For example, if, between sub-frames, the focus of the user's eyes shifts to the left, then a pan logic block of the display may determine and apply a two-dimensional shift to the image of the current sub-frame, moving the sub-frame so that it is shifted to the left by a corresponding number of pixels to cause the image to appear in the same location within the user's field of view despite the user's eye movement.

In particular embodiments, two-dimensional shifts may also be applied to correct for non-uniformities in the display such as manufacturing defects in the underlying light-emitter arrays or malfunctioning light emitters that emit less light than required or even no light. The effect of the high up-sampled frame rate causes the perceived image for the user to be a composite of multiple sub-frames, and, for example, sub-frame image pixel colors for a malfunctioning light emitter may be shared among neighboring light emitters by moving the entire sub-frame one or two pixels in a repeating pattern. The effect may be to correct image errors without blurring the image.

In particular embodiments, an image processing block of the display may apply a two- or three-dimensional dithering effect to propagate pixel color value errors among neighboring light emitters and optionally to future sub-frames. Thus, the dithering may be performed within two spatial dimensions and in a temporal dimension. This dithering effect, combined with the compositing effect of the high up-sampled frame rate, may allow the display to simulate a display with advanced image color precision (e.g., 8 or 10 bit) while being composed of light emitters with a much lesser image color precision (e.g., 4 or 5 bits). Dithering and compositing effects may be further used to correct for additional display non-uniformities, and to simulate other more expensive display components using components chosen for lower cost and higher up-sampled frame rate and properties of the human eye.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
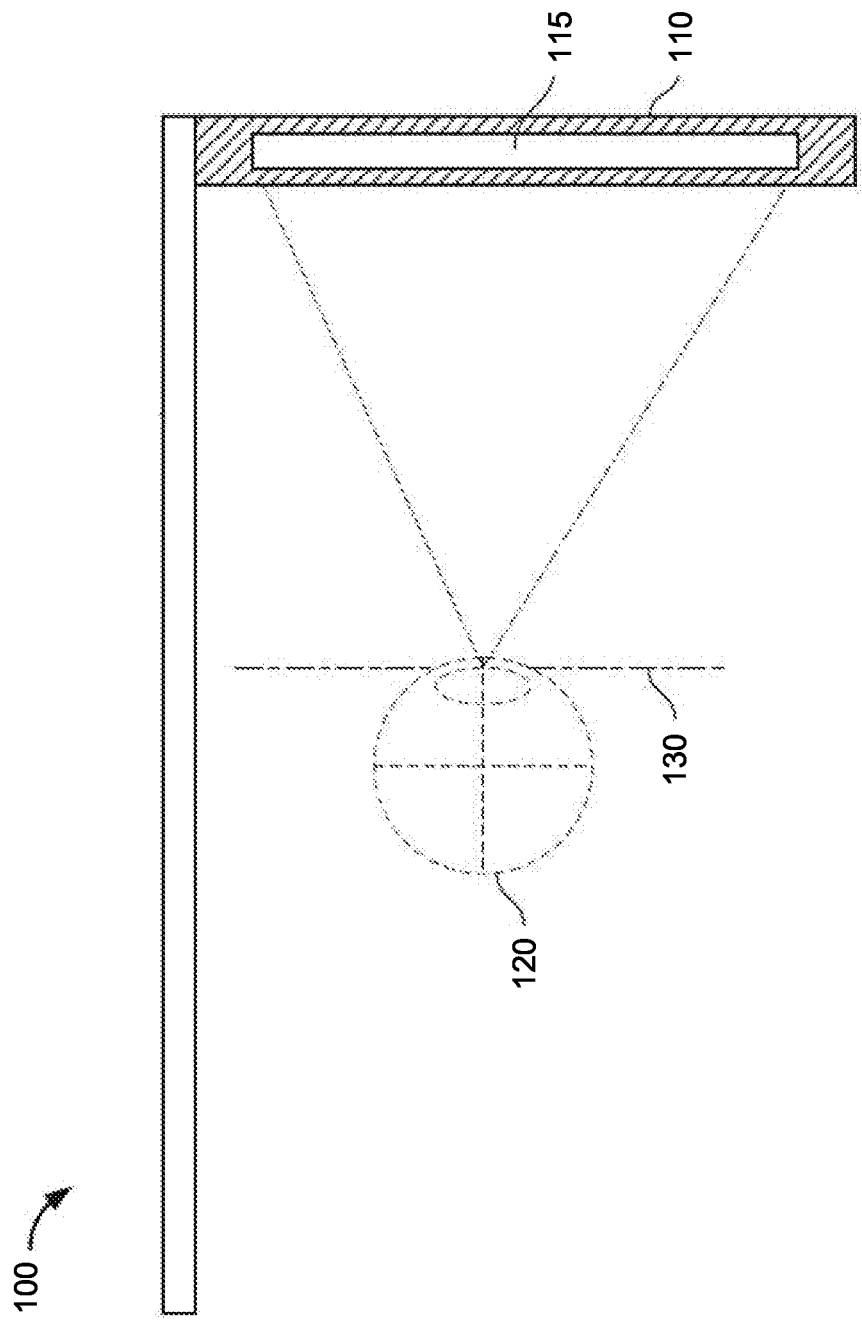
FIG. 1 illustrates a cross section of an example head mounted display and display system.

Because artificial reality devices involve creating digital scenes or superposing computer-generated imagery onto a view of the real world, they provide a platform for designers and engineers to provide new forms of information, entertainment, or methods of collaboration. For example, artificial reality devices may allow users to communicate, seemingly in person, over long distances, or assist users by informing them of the environment around them in an unobtrusive manner. Because artificial reality experiences can often be customized, the user's experience with artificial reality may be deeply personal and highly engaging if presented with sufficient clarity and convenience.

One way that artificial reality experiences can augment human ability is with computer-generated images and/or text added to the real world, as in an augmented or mixed reality. From this simple principle, a variety of compelling use cases can be considered. Labels (e.g., texts, glyphs, etc.) or images describing a real-world object may be fixed in the world space (e.g., location-aware labels acting as street signs or providing a live map of a bike path), or images fixed to a real-world object as it moves through the space (e.g., a label added to a bus as it going on its route that provides detailed information about its route or capacity). Labels could also be used to help a user navigate through an unfamiliar city (e.g., creating a waypoint for the nearest restroom), or help find a friend in a crowd (e.g., a socially-aware waypoint fixed to another user). Other experiences worth considering may be based on interactions with real-world objects. For example, a user could "project" video onto a wall or screen that allows for the video to be played and visible to only herself or to others with access to a shared augmented space. As another example, a user could fix computer-generated text to a physical object to act as an augmented-reality book or magazine. Content could be displayed relative to the object (allowing a user to physical asset aside an augmented-reality) or could be displayed in a fixed relation to the user's (e.g., a tutorial video constantly playing in a corner of the view). Presented media could be customized to the user, so that the same content display space could content relevant to each person viewing the same physical space. As another example, a user could interact with computer-generated graphics by "touching" an icon, or "manipulating" the computer-generated images manually. These graphics could be shown to multiple users working on a project, enabling opportunities for team collaboration (e.g., multiple architects working on a three-dimensional digital prototype in a building together in real-time).

To facilitate use, the display that outputs the computer-generated graphics should be intuitive, easily accessible, and unobtrusive. One approach to displaying high definition artificial reality graphics to a user is a head-mounted display (HMD) comprising a near eye display (NED). The user wears an apparatus, such as a visor, headset, or glasses, capable of displaying computer graphics. In augmented or mixed reality experiences, the computer graphics can be seen alongside, or on top of, the physical world. However, rendering these computer graphics is computationally intensive. Therefore, in most cases rendering is performed by powerful computers communicatively attached (e.g., via a cable or wireless communication protocol, such as Bluetooth) to a HMD. In such a configuration, the HMD is limited by bulky cords, bandwidth and power limitations, heat restrictions, and other related constraints. Yet, the limits of these constraints are being pushed. HMDs that are comfortable and efficient enough for day-long wear, yet powerful enough to display sophisticated graphics are currently being developed.

FIG. 1 is a cross-section of a HMD 100 and display device 110, according to some embodiments. The display device 110 may include at least one waveguide configuration 115. FIG. 1 shows an eyebox 130, which is a location where the eye 120 is positioned when the user wears the display device 110. As long as the eye 120 is aligned with the eyebox 130, the user may be able to see a full-color image or a pupil replication directed toward the eyebox 130 by the waveguide configuration 110. The waveguide configuration 115 may produce and direct many pupil replications to the eyebox 130. For purposes of illustration, FIG. 1 shows the cross-section associated with a single eye 120 and single waveguide configuration 115. In some alternative embodiments, another waveguide configuration may provide image light to an eyebox located at another eye 120 of the user.

The waveguide configuration 115, as illustrated in FIG. 1, may be configured to direct the image light to an eyebox located proximate to the eye 120. The waveguide configuration 115 may be composed of one or more materials (e.g., plastic, glass, etc.) with one or more refractive indices that effectively minimize the weight and widen an FOV of the display device 110. In alternate configurations, the display device 110 may include one or more optical elements between the waveguide configuration 115 and the eye 120. The optical elements may act to, e.g., correct aberrations in image light emitted from the waveguide configuration 110, magnify image light emitted from the waveguide configuration 115, make some other optical adjustment of image light emitted from the waveguide configuration 115, or perform some combination thereof. Examples of optical elements may include an aperture, a Fresnel lens, a refractive (e.g., convex and/or concave) lens, a reflective surface, a filter, or any other suitable optical element that affects image light. The waveguide configuration 115 may include a waveguide with one or more sets of Bragg gratings.

One form of display that may be used in a HMD may be referred to as a scanline or one-dimensional ("1D") waveguide display. In this display a row of light emitters may generate the light source that is used to illuminate the entire vertical space (or horizontal space, where appropriate) of the display. Multiple smaller images are combined to form a larger composite image. A scanning element may cause the source light, treated by light guiding components, to be output to the eye of the user in a specific pattern corresponding to a generation pattern used by the emitters to optimize a display draw rate. For example, the light emitters may first be provided color values corresponding to a single row of pixels along the top of a display image. The light may be transferred to the appropriate section of the eyebox using a waveguide-based process assisted with a microelectromechanical system powered oscillating mirror. After a short period of time, the light emitters may be provided color values corresponding to the next row of pixels (e.g., below the first). The light for this section of the image may then use the same process to position the color values in the appropriate position. All emitters need not be active at once, and in addition to a variety of other factors, scanning displays may require less power to run, and may generate less heat, than traditional display comprised of the same emitters. They may have less weight as well, owing in part to the quality of the materials used in the scanning element and optics system. While such a display may be space-efficient, the frame rate of the display is limited based on the oscillation speed of the mirror.

Another form of display that may be used in a HMD may be a 2D or two-dimensional waveguide display. In such a display, no oscillating mirror is required, as a light emitter array made be used that comprises vertical and horizontal components. Where the 1D variant must light the display on a row-by-row basis, the 2D variant may be capable of providing a significantly improved frame rate because it is not dependent on the oscillating mirror to provide the vertical component. To further improve the frame rate, the light emitters of a 2D waveguide display may be bonded to the controller and/or memory providing driving instructions for the display system. For example, µLEDs of a µLED array may be bonded directly to the memory that holds the color instructions for the display and/or the driver transistors. The result of a such a configuration is that the µLEDs for such a display may be operable with a frame rate that is considerably faster than conventional displays. In some embodiments, the NED may comprise multiple light emitter arrays, each configured to emit a particular color. The colors may be combined by a coupling component of a waveguide system that directs the light along a total internal reflection path to a user's eye. Furthermore, projected light may first pass through a very small air gap between the light emitter array and the waveguide before interacting with a coupling element, incorporated into the waveguide. The path, in some examples, can include grating structures or other types of light decoupling structures that decouple portions of the light from the total internal reflection path to direct multiple instances of an image, "pupil replications," out of the waveguide at different places and toward an eyebox of an HMD.

Figure 2:
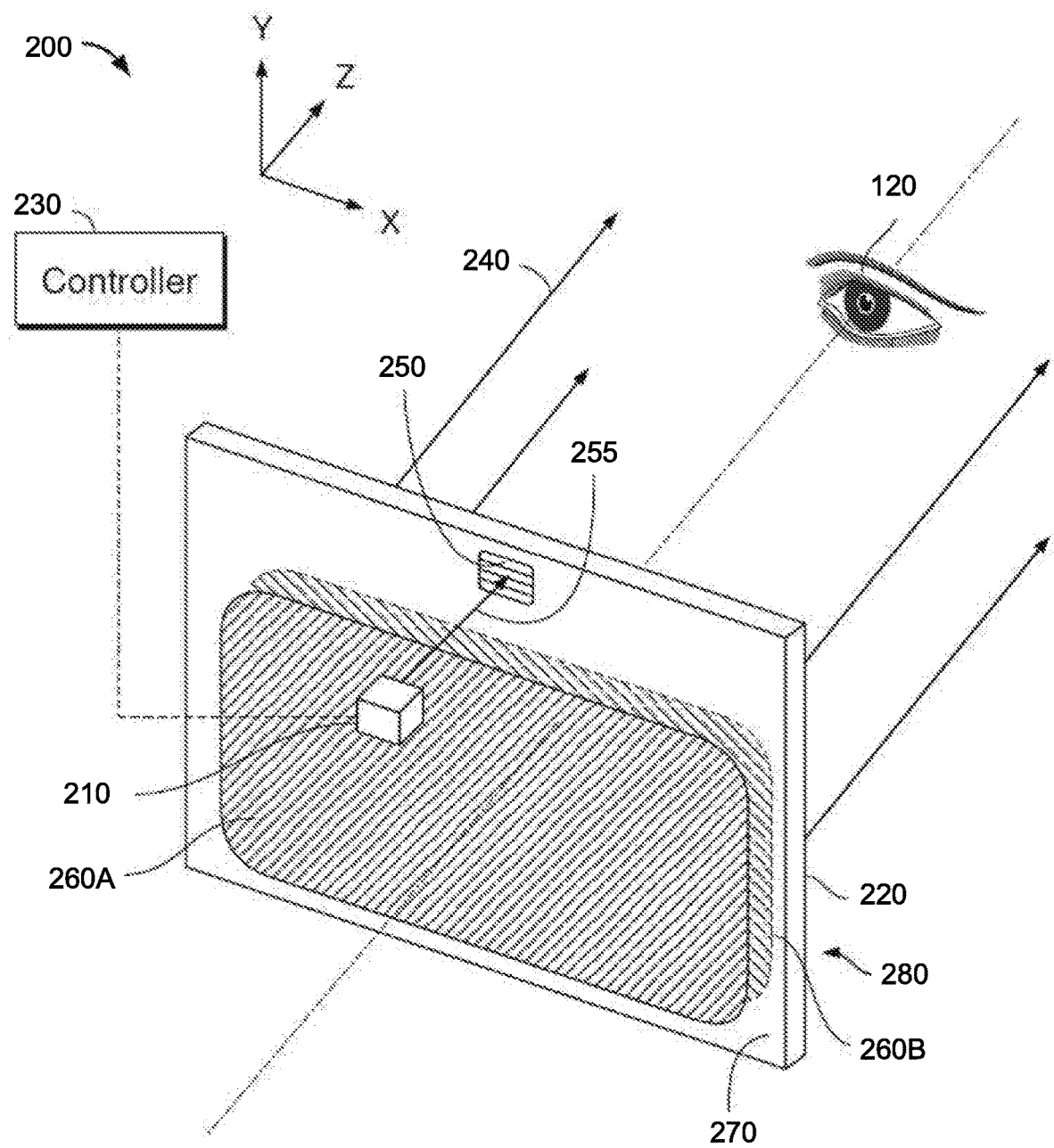
FIG. 2 illustrates an isometric view of an example display system.

FIG. 2 illustrates an isometric view of a display system or NED 200, according to some embodiments. In some embodiments, the NED 200 may be a component of the HMD 100. In alternate embodiments, the NED 200 may be part of another HMD or other system that directs image light to a particular location.

The NED 200 may include a projector device 210, a waveguide 220, and a controller 230. For purposes of illustration, FIG. 2 shows the NED 200 associated with a single eye 120, but in some embodiments another waveguide that is completely separate or partially separate from the NED 200 may provide image light to another eye of the user. In a partially separate system, one or more components may be shared between the waveguides for each eye. In some instances, a single waveguide 220 may provide image light to both eyes of the user. Also, in some examples, the waveguide 220 may be one of multiple waveguides of a waveguide configuration, as is described more fully below.

The projector device 210 may generate light including one or more two-dimensional images. The projector device 210 may include one or more optical sources and an optics system. The projector device 210 may generate and project image light 255, including at least one two-dimensional image, to a coupling area 250 located on a top surface 270 of the waveguide 220. The image light 255 may propagate along a dimension or axis toward the coupling area 250. For example, the projector device 210 may comprise one or more arrays of µLEDs. Although this disclosure will refer to an array of µLEDs, any other light emitter capable of the described properties may be used.

The waveguide 220 may be an optical waveguide that outputs two-dimensional images in image light 240 directed to the eye 120 of a user. The waveguide 220 may receive the image light 255 at a coupling area 250, which may include one or more coupling elements located on the top surface 270 and/or within the body of the waveguide 220, and may guide the received image light 255 to a propagation area of the waveguide 220. A coupling element of the coupling area 250 may be, e.g., a diffraction grating, a holographic grating, one or more cascaded reflectors, one or more prismatic surface elements, an array of holographic reflectors, a metamaterial surface, or some combination thereof. An exemplary coupling element may be a grating having a pitch of approximately 200 nm to approximately 600 nm. In some configurations, each of the coupling elements in the coupling area 250 may have substantially the same area along the X-axis and the Y-axis dimensions and may be separated by a distance along the Z-axis (e.g., on the top surface 270 and the bottom surface 280, or both on the top surface 270 but separated by an interfacial layer (not shown), or on the bottom surface 280 and separated with an interfacial layer or both embedded into the body of the waveguide 220 but separated with the interfacial layer). The coupling area 250 may be understood as extending from the top surface 270 to the bottom surface 280. The coupling area 250 may redirect received image light, according to a first grating vector, into a propagation area of the waveguide 220 formed in the body of the waveguide 220 between decoupling elements.

A decoupling element 260A may redirect the totally internally reflected image light from the waveguide 220 such that it may be decoupled through a decoupling element 260B. The decoupling element 260A may be part of, affixed to, or formed in, the top surface 270 of the waveguide 220. The decoupling element 260B may be part of, affixed to, or formed in, the bottom surface 280 of the waveguide 220, such that the decoupling element 260A is opposed to the decoupling element 260B with a propagation area extending therebetween. The decoupling elements 260A and 260B may be, e.g., a diffraction grating, a holographic grating, an array of holographic reflectors, etc., and together may form a decoupling area. In some embodiments, each of the decoupling elements 260A and 260B may have substantially the same area along the X-axis and the Y-axis dimensions and may be separated by a distance along the Z-axis.

In some embodiments, one or more controllers (such as the controller 230) may control the operations of the projector device 210. The controller 230 may generate display instructions for a display system of the projector device 210. The display instructions may include instructions to project or emit one or more images. In some embodiments, display instructions may include frame image color data. The display instructions may be received from, e.g., a processing device included in the HMD 100 of FIG. 1 or in wireless or wired communication therewith. The display instructions may further include instructions for moving the projector device 210 or for moving the waveguide 220 by activating an actuation system. The controller 230 may include a combination of hardware, software, and/or firmware not explicitly shown herein so as not to obscure other aspects of the disclosure.

In particular embodiments, to improve the rate of immersion for the user viewing an image through a HMD 100, it may be desirable to have a high display resolution and include many μLEDs in an array to act as a light-emitting source for the projector device 210. One consequence of such an arrangement is that high-resolution displays may require a lower duty cycle. The duty cycle of a LED refers to the percentage of a period in which the LED is "on" during the display cycle of a single frame. In general, a longer duty cycle creates the opportunity for a greater degree of motion blur or pixel smear. This is less of an issue with lower resolution displays because smaller movements are more difficult to detect with less resolution. Because high-resolution displays require a lower duty cycle, the brightness of an LED during that active portion of the display cycle for each frame must be much higher. This may be less power efficient and may also put additional strain on the LEDs and the components delivering power to them. In effect, with a low duty cycle, the LEDs must operate at a greater brightness to achieve the target levels of perceived brightness. Although this disclosure describes displays in a particular manner, this disclosure contemplates any suitable displays.

Since its inception, artificial reality (e.g., AR, VR, MR) technology has been plagued with the problem of latency in rendering AR/VR/MR objects in response to sudden changes in a user's perspective of an AR/VR/MR scene. To create an immersive environment, users may need to be able to move their eyes or heads around when viewing a scene and the environment may need to respond immediately by adjusting the view presented to the user. Each eye movement or head movement may slightly change the user's perspective of the scene. These movements may be small but sporadic and difficult to predict. A problem to be solved is that the eye/head movements may occur quickly, requiring that the view of the scene be modified rapidly to account for changes in perspective that occur with the movements. If this is not done rapidly enough, the resulting latency may cause a user to experience a sensory dissonance that can lead to virtual reality sickness or discomfort, or at the very least, a disruption to the immersive nature of the experience. Re-rendering a view in its entirety to account for these changes in perspective may be resource intensive, and it may only be possible to do so at a relatively low frame rate (e.g., 60 Hz, or once every 1/60th of a second). For example, a view may include dozens of virtual objects, each of which may be represented by hundreds or thousands of individual polygons. To properly determine the effect of a perspective shift, the thousands of polygons must be rendered again with new input information regarding the viewer's position. This processing requires a significant amount of computing power and limits the maximum output of a renderer, often limited to 30-60 Hz. A renderer with enough power to reach higher frame rates is often not commercially feasible, or is unsuitable for particular use cases such as portable operations including laptop systems or HMDs where power consumption may require careful monitoring.

As an additional drawback to displaying frames at a standard rate is that the image is fixed while it is displayed, even if the user's eyes move. Consider that an image may be generated at time $t_0$. The position of the user's eye/head may have shifted between time $t_0$ and the time $t_1$ at which the frame is actually shown to the user. As the position of a user's eye/head continues to move (e.g., at time $t_1$), a misalignment may be produced between the fixed position of the image (at time $t_0$) relative to the shifted position of the user's eye/head (at time $t_1$). Especially in scanline displays, the misalignment may cause visual artifacts to appear, such as smearing or blurring effect. Visual artifacts may be more pronounced as the resolution of the display increases. Small amounts of smear (in real terms) are more difficult to detect in lower resolution displays because there are less pixels over which the effected image may be moved. In higher resolution displays, even small movements may affect a relatively large number of pixels, making the visual artifact more apparent. For example, the position of a user's eye/head may shift at 60 pixels per millisecond (in other words, objects within the field of view of the user should have been shifted to appear stationary in the world coordinate system while a user's eye/head moves between time $t_0$ and time $t_1$). Accordingly, if the fixed image is displayed for one-tenth of a millisecond (corresponding to approximately 100 Hz), then the resulting misalignment may be as large as 6 pixels, causing a visible pixel smear.

Visual artifacts such as pixel smear may degrade the user experience by distracting the user and/or reducing the quality of a rendered image. The problem is even more acute in HMDs, where the proximity of the display to the user's eyes allows the user to detect smaller degrees of pixel smearing. Visual artifacts may break the user's immersion into the experience presented to the user or may cause physical discomfort the user in extreme situations. Accordingly, methods to improve rendering performance would be useful.

Figure 3:
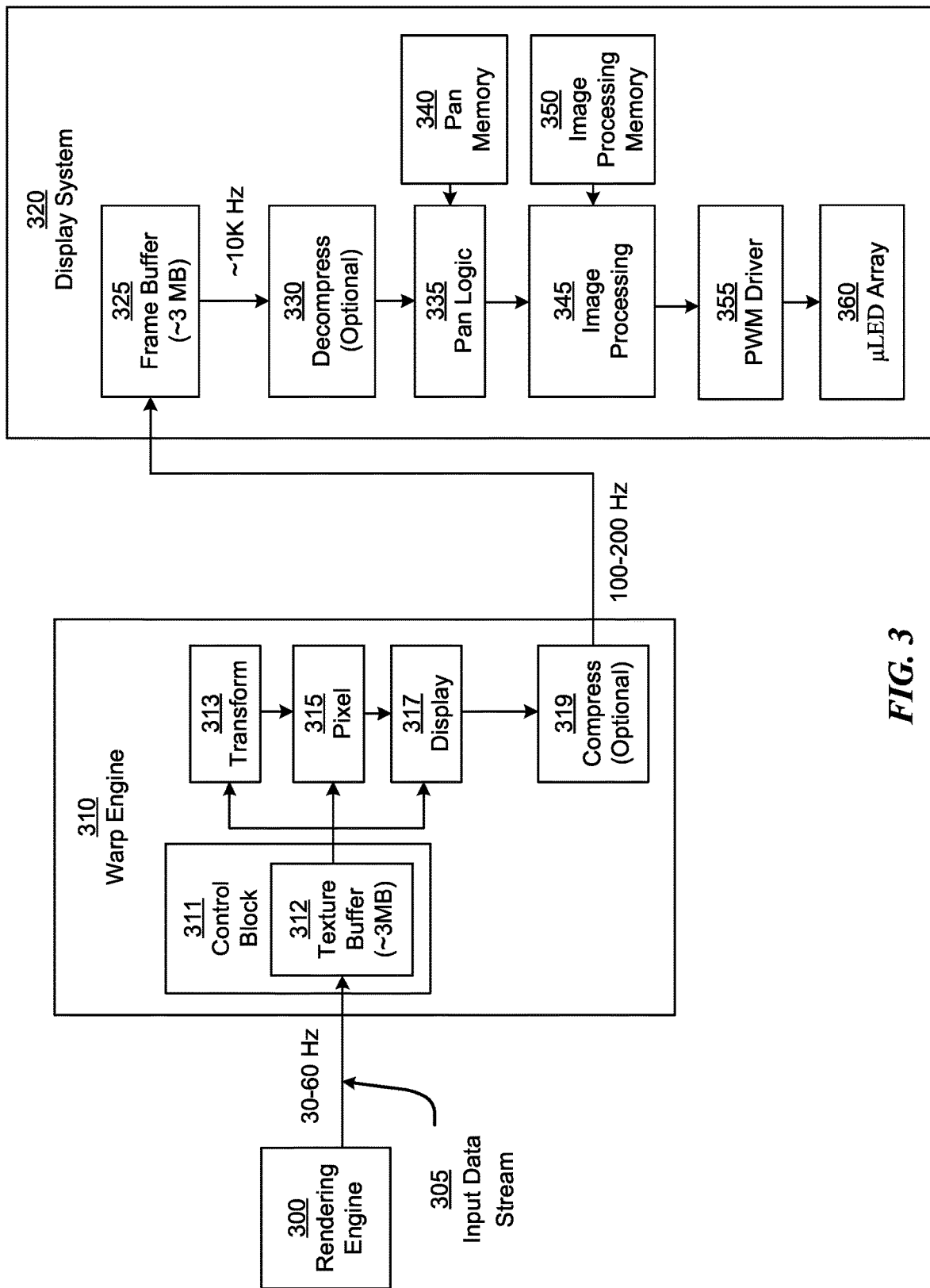
FIG. 3 illustrates an example architecture for a display system.

One approach for accounting for image misalignment due to the latency between a displayed image (at time $t_0$) and the viewing perspective of a user (at time $t_1$) is to increase the frame rates of images to be presented to the user. Having a higher-frequency frame rate enables the displayed image to be more up-to-date with respect to the user's viewing perspective. FIG. 3 illustrates an example architecture of a graphics rendering system. The system may include a rendering engine 300, a warp engine 310, and a display system 320 capable of outputting graphics to the user with a very fast frame rate. In particular embodiments, the display system 320 may be configured to receive frame data at a particular rate (e.g., 100-200 Hz) and up-sample the frame rate to, e.g., 10 kHz.

In particular embodiments, a rendering engine 300 may produce images to be displayed to a viewer. The rendering engine 300 may be any suitable component for generating primary image frames. The rendering engine 300 may comprise a graphics processing unit of a standalone device such as a laptop or desktop computer, video game console, or any other suitable local graphics rendering system. The rendering engine 300 may comprise a device easily-worn on the user's body, such as a cellphone, tablet, or any other suitable compact graphics rendering system. In particular embodiments, the rendering engine 300 may be capable of real-time rendering of interactive graphics based on three-dimensional ("3D") models defined by a plurality of polygons (or vertices for polygons) and associated color data and rendering instructions. The rendering engine 300 may further receive information about a viewer's perspective into the virtual scene (e.g., the location of a HMD 100 worn by a user relative to the rest of the virtual scene). The rendering engine 300 may process the polygons and color data and produce rendering data. Due to the high processing requirements of rendering high-quality, complex virtual objects, the rendering engine 300 may only be capable of rendering data at a relatively low rate, e.g., 30-60 Hz. In particular embodiments, the rendering data generated by the rendering engine 300 may include pixel color values, pixel color locations, or one or more other data primaries associated with the image frame The rendering engine 300 may receive primary rendering data for a rendering request. The primary rendering data may include two- or three-dimensional models, textures, and instructions for rendering computer-generated images, viewing direction data, and other suitable information. The rendering engine 300 may perform steps to render aspects of an artificial reality scene based on the received primary rendering data. For example, the rendering engine 300 may perform visibility computations using ray tracing, rasterization, or other suitable techniques to determine which polygons of which 3D models of virtual objects in a virtual scene are visible through which pixels of a display. Based on the visibility determinations, the rendering engine 300 may perform shading computations to determine the appropriate color for each pixel. In particular embodiments, the rendering engine 300 may process compressed or decompressed streaming video data.

In particular embodiments, the rendering engine 300 may generate one or more specialized object primitives, e.g., "surfaces," for use by a warp engine 310 or display system 320. As an example, the rendering engine 300 may generate surfaces by first rendering 2D images from 3D models, as in a typical rendering pipeline. The rendering engine 300 may then generate surfaces from the 2D images using an additional post-processing method. As another example, the rendering engine 300 may directly output surfaces from 3D models, eliminating extra steps directed only to rendering 2D images. As another example, the rendering engine 300 may output 2D images from 3D models to a warp engine 310. The warp engine 310 may generate surfaces using an additional post-processing method based on the 2D images.

Surfaces may comprise information useful for rendering one or more virtual objects of an artificial reality scene. The information may include location and/or position data for the surface in the scene, specified in the coordinate system of the view space relative to the virtual camera/viewer. Alternatively, the location of the surface may be specified in any other suitable coordinate system, such as the world space coordinate system. The surface may further include texture data, represented by one or more texel arrays. Thus, in particular embodiments, a "surface" may be considered as a rectangular texture with a transformation matrix to specify its location within a scene. Each texel in the texel array may have color information and a 2D coordinate within the texel array (e.g., specified in (u, v) coordinates). In particular embodiments, the color information of each texel may indicate the intensity of several color channels (e.g., red, green, and blue) and alpha information that indicates the texel's transparency level (e.g., completely transparent, completely opaque, or somewhere in between). In other embodiments, the color information of a texel may indicate the intensity of red, green, and blue without separately specifying the transparency level. In this case, the value for each color may be pre-multiplied by the texel's associated transparency level (e.g., if the texel is fully transparent with an alpha level of 0, then the red, green and blue values for that texel would all be zeroed-out by being multiplied by the 0 alpha level).

The texture data of a surface may be generated based on the result of a standard graphics rendering pipeline, embodying techniques to optimally determine the colors that should be displayed by the pixels of a display or image based on the perspective of a viewer in a three-dimensional scene. In particular embodiments, the warp engine 310 may limit the number of surfaces (e.g., a maximum of 16 surfaces or any other suitable number of surfaces) that it will process to ensure sufficient simplicity in the scene so that performance demands can be met (e.g., so that the warp engine 310 may output frames at 100-200 Hz). Therefore, certain virtual objects in the artificial reality scene may be grouped. Each surface may be a representation of one or more objects or sets of points within the scene that are expected to move/translate, skew, scale, distort, or otherwise change in appearance together, as one unit, as a result of a change in a user's perspective of the scene (e.g., resulting from a HMD 100 on a user's head moving to a different position and/or orientation).

The rendering engine 300 may communicate with a HMD 100 through one or more wired or wireless connections. In particular embodiments, a user may be able to select how the rendering engine 300 and HMD 100 communicate based on the user's needs. In particular embodiments, a warp engine 310 and a display system 320 may be incorporated into the HMD 100. The warp engine 310 (or, in particular embodiments, the display system 320) may be configured to receive data, such as surfaces and other rendering instructions, from the rendering engine 300. The warp engine 310 may comprise a central CPU or GPU (or application specific integrated circuits) for the HMD 100. The display system 320 may further comprise one or more additional integrated circuits. In particular embodiments, the warp engine 310 and display system 320 may be logical blocks, with operations shared by a single integrated circuit or set of integrated circuits. A HMD 100 may further comprise additional components that facilitate the rendering and display of an artificial scene including additional image processing components, eye-tracking components, heat detection components, any other suitable components, or any combination thereof.

In particular embodiments, the warp engine 310 may calculate one or more three-dimensional geometric warps of the image based on the image data and other received information. These operations may improve the quality and/or accuracy of images to be displayed to a user (e.g., improving placement of images relative to the user's physical position in a space). The warp engine 310 may comprise four top-level blocks. As shown in FIG. 3, these blocks may include a control block 311, a transform block 313, a pixel block 315, and a display block 317. One or more of the components of the warp engine 310 may be configured to communicate via one or more high-speed buses, shared memories, or through any other suitable method. In particular embodiments, the control block 311 of warp engine 310 may be configured to communicate with a transform block 313, pixel block 315, and display block 317 of two or more mirrored pipelines (not shown). In particular embodiments, each pipeline of warp engine 310 may be dedicated to preparing images for a separate display or display system 320. Each display or display system 320 may be configured to display images to a user's left and right eye, or a portion thereof, respectively. This communication may include data as well as control signals, interrupts and other instructions. The two pipelines may be capable of operating independently of the other.

In particular embodiments, the control block 310 may receive an input data stream 305 from the rendering engine 300 and initialize a pipeline in the warp engine 310 to prepare the rendering for display. In particular embodiments, the input data stream 305 may comprise data and control packets from the primary rendering component 300. The data and control packets may include information such as one or more surfaces comprising texture data and position data and additional rendering instructions. The control block 311 may distribute data as needed to one or more other blocks of the warp engine 310 through a texture buffer 312 of the control block 311. The control block 311 may initiate pipeline processing for one or more frames to be displayed. In particular embodiments, a HMD 100 may comprise multiple warp engines 310 and each may comprise its own control block 311.

In particular embodiments, a transform blocks 313 of the warp engine 310 may determine initial visibility information for surfaces to be displayed in an artificial reality scene. In general, a transform block 313 may cast rays from pixel locations on a display based on a viewing direction and produce filter commands (e.g., filtering based on bilinear or other types of interpolation techniques) to send to the pixel block 315. A transform block 313 may perform raycasting from the current viewpoint of the user (e.g., determined using inertial measurement units, eye trackers, and/or any suitable tracking/localization algorithms, such as simultaneous localization and mapping) into the artificial scene where surfaces are positioned and may produce results to send to the pixel block 315.

In general, a transform block 313 may comprise a four-stage pipeline, in accordance with particular embodiments. The stages of a transform block 313 may proceeds as follows. A ray caster may issue ray bundles corresponding to arrays of one or more aligned pixels, or "tiles." The ray bundles may be warped, before entering the artificial reality scene, according to one or more distortion meshes. The distortion meshes may be configured to correct geometric distortion effects stemming from, at least, a display or waveguide of a HMD 100. A transform block 313 may determine whether each ray bundle intersects with surfaces in the scene by comparing a bounding box of each tile to bounding boxes for each surface. If a ray bundle does not intersect with a surface, it may be discarded. Tile-surface intersections are detected, and corresponding tile-surface pairs may be passed to a pixel block 315.

In general, a pixel block 315 may determine color values from the tile-surface pairs to produce pixel color values in accordance with particular embodiments. The color values for each pixel may be sampled from the texture data of surfaces received and stored by the control block 311 (e.g., as part of input data stream 305). A pixel block 315 may receive tile-surface pairs from a transform block 313 and schedule bilinear filtering. For each tile-surface pair, a pixel block 315 may sample color information for the pixels within the tile using color values corresponding to where the projected tile intersects the surface. In particular embodiments, a pixel block 315 may process the red, green, and blue color components separately for each pixel. A pixel block 315 may then output pixel color values to a display block 317 of the warp engine 310.

In general, a display block 317 may receive pixel color values from a pixel block 315, convert the format of the data to be more suitable for output to the display system 320, apply one or more brightness corrections to the pixel color values, and prepare the pixel color values for output to the display system 320. In particular embodiments, a display block 317 may convert tile-order pixel color values generated by a pixel block 315 into scanline- or row-order data, which may be required by a display. Brightness corrections may include brightness correction, gamma mapping, and certain dithering operations. In particular embodiments, a display block 317 may provide pixel output, such as corrected pixel color values, directly to the displays system 320.

In particular embodiments, a compression block 319 of the warp engine may compress the output of the display block 317 prior to outputting the data to the display system 320. The compression may be an optional step, depending on the processing abilities of the display system 320 and the data throughput rate of the connection between the warp engine 310 and display system 320.

The warp engine 310 may provide, as output, enhanced image frame data (including, e.g., pixel color values and locations). The output may be passed to a frame buffer 325 of the display system 320 through, e.g., wireless communication, wired communication, shared memories or caches, etc. The warp engine 310 may provide the frame data at a rate higher than that provided by the rendering engine 300 (e.g., 100-200 Hz compared to the provided 30-60 Hz). Thus, the warp engine 310 may up-sample the image frame rate compared to the rendering engine 300. However, the warp engine 310 may be not capable of reliably increasing the rate at which up-sampled frames are provided to the display system 320, due at in part to the complexity of calculations associated with determining and applying the three-dimensional warps and other operations described above. In particular embodiments, the rendering engine 300 and display system 320 may be configured such that no warp engine 310 is required, thus, while this disclosure describes a graphics display architecture incorporating a warp engine 310, it may be optional in certain embodiments.

Conceptually, the output rate of the rendering engine 300 and warp engine 310, and the output rate of the display system 320, may be inversely proportional with the complexity of the operations performed by each component as well as the necessity of the frequency of those operations. For example, as described above, the rendering engine 300 may render and generate surfaces or other image frame data from graphics primitives (e.g., polygons or meshes). Because of the high computing cost for a graphics rendering pipeline, the rendering engine 300 may be standard hardware that is capable of outputting data at a rate of 30-60 Hz. Moreover, although quickly rendering from primitives is important to accurately portray smooth motion, power and bandwidth limitations may restrict the capabilities of the rendering engine 300. Furthermore, as the rendering engine 300 is capable of correcting for large scale user movement (e.g., large movements of the user's head that affect the artificial reality scene), the output may only need to be updated within the 30-60 Hz range.

The operations of the warp engine 310 may be less onerous in terms of compute resources (e.g., calculating and applying the three-dimensional warp to the image may use less computing resources than rendering from primitives), and therefore the warp engine 310 may be capable of providing output at a rate of 100-200 Hz. In particular embodiments, the warp engine 310 may sample against the geometric representation (e.g., surface) of an image to be displayed produced by the rendering engine 300. While performing the sampling, the warp engine 310 may apply one or more three-dimensional geometric warps to the image to be displayed based on detected user movement between frames provided by the rendering engine 300. For example, the warp engine 310 may provide output to the display system 320 at a rate of 100-200 Hz.

A display system 320 may be configured to perform certain display adjustment operations (e.g., panning and dithering the image) with a low compute cost. The integrated circuits of the display system 320 may be specially configured to efficiently handle these operations. Thus, the display system 320 may be capable of up-sampling the frame rate to from a received rate of 100-200 Hz to up to 10 kHz or greater. The system described herein may be capable of providing an apparent display frame rate of up to 10 kHz to a user with relatively low μLED brightness, using a rendering engine 300 only capable of generating (and/or providing) image frames at a rate of 30-60 Hz.

Figure 4:
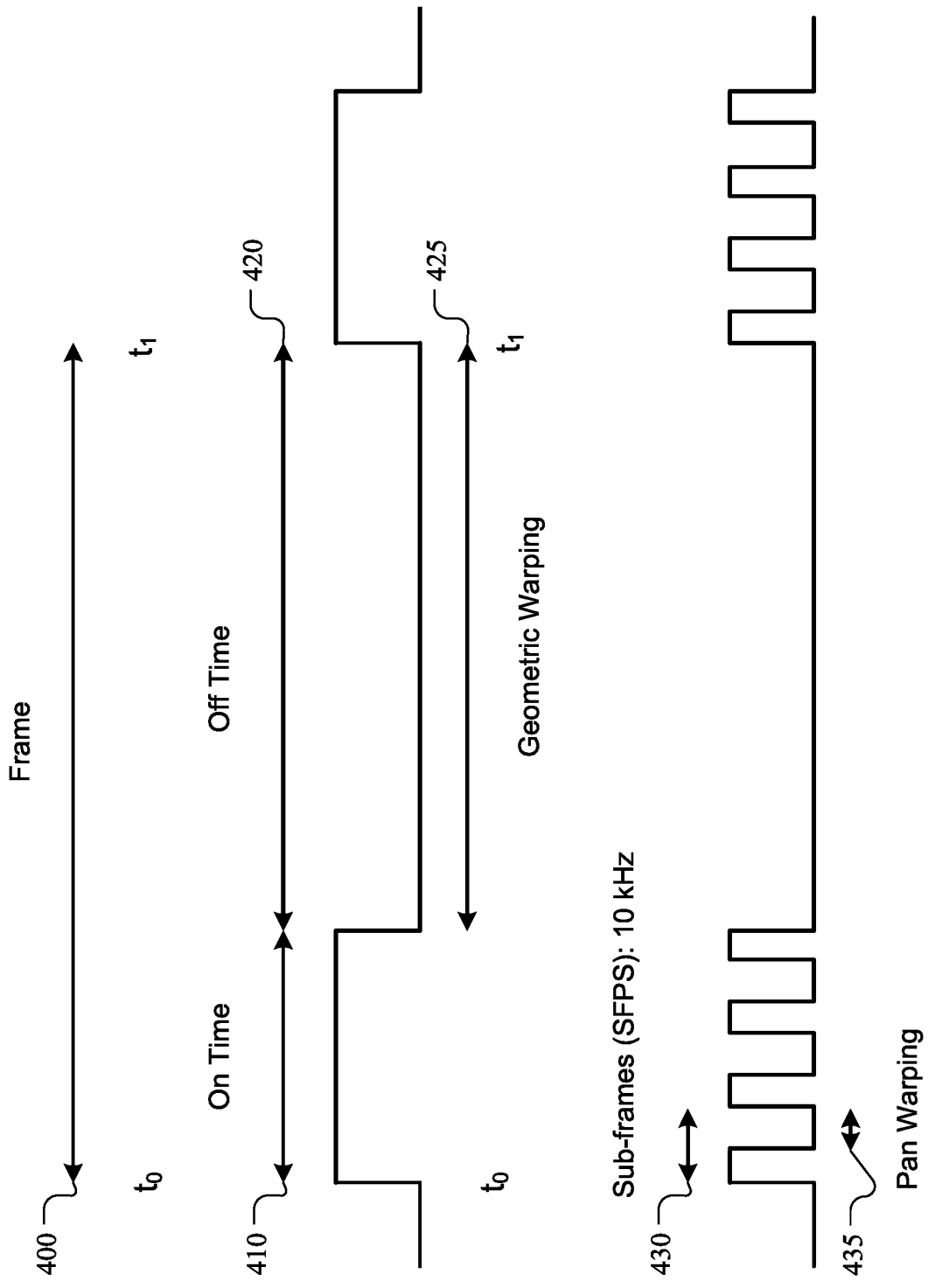
FIG. 4 illustrates example frame-display cycles.

FIG. 4 provides an example of timelines for frames and sub-frames produced by different components of the described system. For each rendered frame, the length of the cycle is shown as the timeline 400. The timeline 400 runs from $t_0$ to $t_1$, during which the image is shown. For example, the time elapsed between $t_0$ to $t_1$ may be around 33 ms (e.g., for a 30 Hz frame cycle) or around 17 ms (e.g., for a 60 Hz frame cycle). For a subset of the time between when the current frame is provided and the next frame is provided, LEDs of a display showing the image are lit. This subset of time 410 may be referred to as the on time. During the remaining period 420, the off time, the LEDs of the display may be powering on, powering off, or undergoing other operations set by physical limitations of the LEDs. However, because each frame is provided only a single on time, the number of times that the image for the frame can be changed is limited by the number of duty cycles (e.g., the time from the start of a first on time to the start of the next on time). In particular embodiments, the frame 400 may coincide with the surface produced by the rendering engine 300.

In particular embodiments, for each rendered frame 400 provided to the display system 320, the display system 320 may divide the frame 400 into multiple display sub-frames 430. For example, in particular embodiments the frame 400 may be provided in accordance with a 30-60 Hz frame rate (from the rendering engine 300) or a 100-200 Hz frame rate (from the warp engine 310). The timeframe during which the warp engine 310 may calculate and apply geometric warps (or other operations) is shown as timeline 425. This is the timeframe during which the warp engine 310 may update the image data for each frame provided to the display system 320. Because the calculations are somewhat computationally expensive, the image data may require large amounts of updating (e.g., to correct for large user movements).

The timeframe for the operations of the display system 320 is shown as timeline 430. The display system 320 divides the rendered frame 400 into multiple display sub-frames 430. Each sub-frame 430 is associated with its own LED duty cycle. The display system 320 thus increases the effective display frame rate. As an example, and not by way of limitation, for each rendered frame 400, the display frame rate may be up-sampled to a 10 kHz or greater effective frame rate. The display system 320 is further capable of modifying the frame image data for each sub-frame 430 (e.g., applying pan warps, dithering, and non-uniformity corrections, possibly based on updated image or sensor data including a viewing direction) during the sub-frame off cycle 435, greatly increasing the opportunities for modifying the image data before it is output to the user. Each individual sub-frame accounts for a small amount of modification of the image, allowing the motion to appear much smoother than in the absence of the up-sampling display system 320.

As the display frame rate increases, the amount of time that a given sub-frame image is shown on the display decreases, which subsequently decreases the opportunity for pixel smearing to occur. Accordingly, each individual frame may be replaced by a set of up-sampled sub-frames that are each sequentially displayed to the user during the display time interval for the frame. This may have the effect of smoothing the motion, providing an appearance on part with a native 10 kHz frame rate without increasing the rendering computing power needed to produce the images to the same degree as would be required to produce an effective 10 kHz frame rate using traditional techniques.

As a further benefit to up-sampling the display frame rate of an image, in particular embodiments, the perceived brightness of the overall image may increase. In typical systems, (e.g., in which the display receives rendered frames and outputs them at 30-60 Hz), as the on time of the image decreases, the perceived brightness of the image also decreases to a point. To compensate, the brightness of the display (for example, the individual LEDs of the display) must be increased. Thus, the power requirements for particularly high frame rate displays can be burdensome. This is unsuitable for battery-reliant operations, such as in displays intended for mobile devices or HMDs. However, the perceived brightness may be increased when the frame rate is high enough that the eye does not perceive an "off-time" for the image. Thus, to compensate for a shorter duty cycle, rather than increase the brightness of the LED, in particular embodiments, the described display system 320 may be capable of increasing the number of active cycles. Up-sampling a frame rate from 30 Hz or 100 Hz to up to 10 kHz (or greater) may be more power efficient, as the brightness levels required for the display can be reduced. In a similar manner, up-sampling may allow for richer color depth and crisper images for the display, which may be particularly well-suited for artificial reality applications. Although additional computing operations are required to up-sample the frame rate, the benefits in the form of a significantly faster apparent frame rate, increased perceived brightness (and subsequent decreased display brightness requirements), and image correction opportunities, outweigh the cost of the additional operations.

Although the following description of the components of the display system 320 is presented as one-dimensional pipeline, in particular embodiments, the order of the components may be changed, one or more additional buffers may be used, and one or more cycles among components may exist. Furthermore, the operations of the various blocks may be performed by shared hardware, such that the "pipeline" of operations is performed as a single calculation, increasing the speed of computation.

In particular embodiments, a display system configured to perform up-sampling as described may enable opportunities to improve the user experience. A pan logic block 335 of a display system 320 may adjust each sub-frame before it is sent to a μLED array 360 used by the display system 320. In particular embodiments, the pan logic block 335 may move a sub-frame along a horizontal and/or vertical axis by one or more pixels. For example, as the viewer's head or eyes move between frame updates, the pan logic block 335 may compute a two-dimensional translation (or "pan") relative to the original position of the frame along the display surface for one or more sub-frames based on the determined change in position of the user's head. The pan logic block 335, in combination with the up-sampled display frame rate, may minimize visual defects ordinarily produced in a rendered frame by movement of the user's head or eyes.

In particular embodiments, the pan logic block 335 may receive as input a position of a user's head from one or more movement detection components of an HMD 100. A movement detection component may comprise one or more inertial measurement units, gyroscopes, head trackers, other suitable components, or any suitable combination thereof. The pan logic block 335 may alternatively or additionally receive as input a position of a user's eyes from one or more eye movement, gaze trackers, or other suitable components of a head mounted display system. The movement information may be compared to location information used to generate a previous frame to create differential information.

Based on the received head or eye movement information, the pan logic block 335 may calculate a translational (e.g., left, right, up, down) adjustment of a sub-frame or a layer contributing to the sub-frame to be displayed (e.g., of one of several surfaces). The translational adjustment may compensate for the adjusted position of the user's head and may mitigate the effects on the frame presentation caused by the change in the user's perspective on the virtual scene. In particular embodiments, the translational adjustment or electronic shifting may be inversely proportional to the head or eye movement information and differential information. For example, if the movement information indicates that the user's head has moved in accordance with a pan of 3 pixels to the left and 2 pixels down, the pan logic block 335 may calculate a translational adjustment of the next sub-frame to compensate for the effects of the user's movement on the objects in the displayed image. For example, the pan logic block 335 may calculate a pan of 3 pixels to the right and 2 pixels up to cause the image to appear to stand still despite the user's movement. In particular embodiments, the sub-frame may be composed of multiple layers and the pan logic block 335 may calculate a translational adjustment for one or more of the layers based on the received information. For example, a scene may comprise a virtual clock and an avatar for a user. The clock and avatar may each be separate layers of the sub-frame. After receiving movement information for the user's head or eyes, the pan logic block 335 may calculate a pan of 3 pixels right and 2 pixels up for the virtual clock, and a pan of 5 pixels right and 3 pixels up for the avatar, so that each object may appear to be stationary to the user.

The operations of the pan logic block 335 may help prevent the appearance of visual artifacts that would normally be caused by the user's movement while viewing a display that does not implement the described invention. As described in detail below, the pan logic block 335 may receive other information as input from various other components of the head mounted display system to calculate a translational adjustment to adjust for various display inconsistencies that may be caused by an interaction between the user and the display or even by the display itself (e.g., in design or manufacture). For example, the pan logic block 335 may receive information relating to a scanline refresh rate of a scanline display and may pan the sub-frame to compensate for smearing or tearing effects caused by the difference between the refresh rate and the movement of the user.

In addition to panning the sub-frame to account for a user's movements, the display system 320 may dither the light emitted by the μLEDs of a display and correct for non-uniformities in the display. Dithering may be performed before, after, or contemporaneously with non-uniformity correction. The output of the pan logic block 335 (e.g., the shifted sub-frame) may be passed to an image processing block 345 of the display system 320.

The image processing block 345 may correct for non-uniformities of the display. Non-uniformities may include, for example, and not by way of limitation, one or more malfunctional μLEDs (e.g., μLEDs that produce limited or no light in response to a driving current), color distortions of the display (e.g., μLEDs that display color distortions as the driving current increases and/or decreases), manufacturing errors of the display, varying pixel geometries between color-specific μLEDs, pixel spacing between color-specific μLEDs, and a host of other potential non-uniformities. The high up-sampled frame rate may provide opportunity to correct the non-uniformities. In particular embodiments, a mask required to correct for various errors and non-uniformities may be stored within an image processing block memory 350 to reduce the need for just-in-time calculation of each sub-frame translation.

The image processing block 345 may perform dithering operations for pixel color values specified by the shifted sub-frame. For example, for each μLED of the μLED array underlaying the display, the image processing block 345 may quantize the pixel color value to match the degrees of precision available to the display. The quantized color may create an error: the difference between the quantized value and the specified pixel color value. The error may be propagated to one or more μLEDs around the μLED. This propagated error may be incorporated into the final color for the surrounding μLEDs.

Because of the high up-sampled frame rate, which may produce individual sub-frames at a much greater rate than the human eye can normally perceive, the viewer's eye may integrate multiple displayed sub-frames when viewing the displayed image. This results in a composite perceived frame. For example, small differences (e.g., in color of the same μLED) between two or more sub-frames may be integrated by the viewer's eye. The image processing block 345, taking advantage of this interpretive process, may adjust the position of and/or time of display (e.g., the number of sub-frames) of one or more pixel colors (e.g., on within the array of fixed μLEDs) to produce specific visual effects. Such effects may include, for example, displaying colors at finer gradations. Thus, in addition to single-frame spatial dithering, the dithering block 345 may be capable of performing "three-dimensional dithering." In three-dimensional dithering, the error may be propagated in two spatial dimensions (along the horizontal and vertical axes), and temporal dimension (between a first sub-frame and one or more subsequent sub-frames).

The final output of the image processing block 345 may be a panned, modified image, suitable for displaying the idealized image provided by the rendering engine 300 on the real-world display. This output may be provided to a driver 355 for the display system 320. For example, the drive may be a double-buffered pulse-width modulation driver capable of controlling a μLED array 360. The driver 355 may provide instructions to a μLED array 360 to cause the μLED array 360 to output the specified image. The μLED array 360 may be composed of multiple mesa-shaped μLEDs, with a high light emittance and light generation efficiency. Said μLEDs may be configured such that they support a rapid duty cycle, and especially in which the time delay between receiving an electrical charge and light emittance, or removal of electrical charge and no light emittance, is minimized.

A frame buffer 325 of the display system 320 may receive frame data from the warp engine 310 and make said frame data available to other components of the display system 320 until the next frame is received from the warp engine 310. For example, the frame buffer 325 may be a 3 MB memory of the display system 320. In particular embodiments, the frame buffer 325 may be configured such that it is capable of outputting frame data to the components of the display system 320 at a rate that is degrees of magnitude greater than the rate at which frames are supplied (e.g., the read speed of the memory of the frame buffer 325 may be much greater than the write speed). For example, the frame buffer 325 may be configured such that data may be retrieved at a rate needed to support a display frame rate of up to 10 kHz. The output of the frame buffer 325 may include the pixel color values that comprise the image and their locations within the image. If the frame data received from the warp engine 310 was compressed by a compression block 319, then a decompression block 330 of the display system 320 may decompress the data before, or while, it is retrieved by other block of the display system 320.

A pan logic block 335 of the display system 320 may retrieve pixel data from the frame buffer 325. The pan logic block 335 may optionally receive movement data from one or more movement sensors. The pan logic block 335 may receive this data from the respective sensor, or through another component that also may use the movement data (e.g., the warp engine 310). The movement sensors may include a head or body movement sensor (e.g., an inertial measurement unit), an eye tracker, any other suitable movement sensor, or any combination thereof. The pan logic block 335 may use the movement sensor information to determine a two-dimensional translation, or "pan" of the frame.

In particular, the pan logic block 335 may be configured to determine image pans to mitigate the effect of a viewer's movement relative to the intended presentation of the image. For example, a frame may be provided by the rendering component at time $t_0$, a user may move during the window of time between $t_0$ and the time $t_1$ at which the pixel color values are provided to the pan logic block 335. Information about this movement may be captured by the movement information from the one or more movement sensors. The pan logic block 335 may calculate a 2D translational shift of the image to counteract a change in appearance of the image that would normally be caused by the user's movement. As an example, the warp engine 310 may provide an image of an apple to the frame buffer 325 of the display system 320 at time $t_0$. The pan logic block 335 may use movement information received from the movement sensors to determine that the user's movements between time $t_0$ and the current time $t_1$, would have caused the center of the image to have been rendered three pixels up and 4 pixels to the right had the user been in that position at time $t_0$. The pan logic block 335 may shift the image to counteract the determined movement. This may allow objects in the image to appear to persist at the same location in the world relative to the user's field of view, rather than move or smear. In particular embodiments, the output of the pan logic block 335 may be a shifted image (e.g., using the same pixel color values, to the same degree of precision but with translated positions).

In particular embodiments, because of the particularities of the μLED array underlying the display, optical lenses associated with the display, or effects within the human eye, certain movements may be more impactful than others. For example, it may be determined that movements of the eye while the eye is looking far to the left may cause greater distortion (in terms of number of pixels affected) than movements of the eye while the eye is looking straight ahead. To correct for these differing distortions, a mapping of pan magnification levels and μLED position may be stored in a memory 340 associated with the pan logic block 335. This pan memory 340 may be referred to as an address block. While determining the sub-frame image pan, the pan logic block 335 may look up the position of the user's focal point in the pan memory 340 and use a pan coefficient stored therein to augment the magnitude of the image pan. The pan memory 340 may store additional information, such as an effective field curvature caused by the optics of the display system 320. In particular embodiments, this may be calculated from a linear interpolation between certain control points of the μLED array under of the display system 320 (e.g., the four extreme corners, corners of multiple tiles of the display, other key points). Thus, the pan memory 340 may serve as a fast lookup table holding pan magnification information.

An image processing block 345 may receive the shifted pixel color values from the pan logic block 335. Up to this point, the pixel color values may be values corresponding to a specified level of precision and generated using assumptions to simplify the rendering pipeline. As an example, a first assumption may be that the display system 320 is capable of producing pixel colors coincident with the degree of precision of the provided pixel color values. For example, the rendering engine 300 may provide color values in the form of 8-bit or 10-bit color information for each component (e.g., red, green, blue, and/or alpha) of each pixel color. In reality, the μLEDs may only be able to resolve color gradations of a lesser degree of precision (e.g., 4-bit or 5-bit colors or greyscales). The reasons for this may include that the high up-sampling frame rate may require the use of components that prioritize speed or power-consumption over bit-level precision or that the μLEDs used are chosen based on the ability to execute a duty cycle quickly. The difference between the degree in precision (e.g., between a specified 8-bit color and a physical 4-bit color) may be interpreted as a color value error. For example, an 8-bit color representation is capable of 256 shades of grey, while a 4-bit color representation is only capable of 16. The specified color may fall between one of the 16 colors supported by a 4-bit μLED and the difference between the specified color and the nearest color of the 4-bit μLED may be interpreted as a color value error or color depth precision error.

The image processing block 345 may enable dithering processes that allow the display system 320 to support the 10 kHz up-sampled frame rate, and provide excellent color quality (e.g., 8-bit or 10-bit (256 or 1024 greyscales)), while being based on μLEDs with a much more limited array of color options (e.g., 4-bit or 5-bit (16 or 32 greyscales)). The image processing block 345 may be said to allow the display system 320 to simulate a higher degree of color precision. To account for color value error, the image processing block 345 may be configured to perform one or more error-correcting operations. For example, the image processing block 345 may be configured to modify the pixel color values, the position of the pixel colors, and/or the time of sub-frame display to simulate dithering effects to correct for the lack of pixel color value display precision.

In particular embodiments, the image processing block 345 may propagate errors to neighbor μLEDs. For example, for a particular pixel of a sub-frame, the image processing block 345 may receive a high-precision color value specified in the image data. The image processing block 345 may determine the possible output of the μLED corresponding to the location in the frame for that color. The image processing block 345 may quantize the high-precision color value and determine the difference between the high-precision color and the appropriate µLED color. The image processing block 345 may distribute the color value difference (e.g., error) among surrounding µLEDs. The image processing block 345 may receive color value differences from other µLEDs (which have been simultaneously processed in a similar manner) and use that data to prepare a final color for the µLED. This may be referred to as "spatial dithering" as the error is propagated to nearby µLEDs in terms of physical space with the goal to minimize the total error in a given local area. The distribution of errors may be based on the particular color value (e.g. larger errors or brighter colors may be distributed further through the local area), characteristics of the frame, properties of one or more µLEDs or the µLED array, any other suitable factor, or any combination thereof. In particular embodiments, the described spatial dithering operations may be performed additionally or alternatively with reference to a fixed mask of thresholds, such that error propagation to neighboring LEDs is not used. The mask may be stored in and retrieved from an image processing memory 350. Such a "screening" or "mask-based" method allows for efficient dithering with reduced computational cost, but higher memory usage.

An example dithering process will now be provided using simplified levels of precision. Although the example assumes a "high precision" color value of four bits and a low precision of two bits, any suitable combination of high and low precision bits may be used. For example, the image processing block 345 may receive, for a single µLED, a specified high-precision pixel color value in a 4-bit color system (16 colors). Specified in binary, the color value may be 0b0111 (7). The µLED corresponding to the appropriate location in the frame may only be capable of a 2-bit color representation. To convert the high precision color into a low-precision color, the image processing block 345 may convert the high-precision color into a decimal representation, e.g., 0.4375. The image processing block 345 may then determine the nearest decimal representation that is producible by the µLED, 0.5 (corresponding to 0b10 (2)). The difference between the specified color and the actually producible representation, −0.0625, may be interpreted as a color value error. This color value error may be distributed to other µLEDs neighboring the particular µLED for the position. For example, each µLED neighboring the µLED may have a share of the error applied to its color determination. In an even distribution, eight neighboring µLEDs may have an offset of −0.008 applied. The distribution may also be weighted based on any suitable factors.

Alternatively, or additionally, the image processing block 345 may be configured to perform temporal dithering, in which resultant errors are sent forward in time to future sub-frames. As with spatial dithering, the image processing block 345 may be configured to determine an error for an individual µLED (or a cluster of µLEDs). The image processing block 345 may propagate the error, or some amount thereof, to one or more of the sub-frames that will follow the sub-frame being processed. For example, for a particular µLED, the image processing block 345 may receive resultant errors from previous sub-frames, quantize and calculate the error for the µLED and pixel color value, and prepare the µLED to display the color. Any resultant error may be designated to be sent forward to one or more future sub-frames. The number of sub-frames for which the error is propagated may be based on the degree of error, a difference between the current and previous color values, a record of previous errors propagated, characteristics of the sub-frame, properties of one or more µLEDs or the µLED array, any other suitable factor, or any combination thereof. In the immediately preceding example, the error value, −0.0625, may be designated for a subsequent sub-frame. The next sub-frame for that particular µLED may have an offset of −0.0625 applied. As with spatial dithering, temporal dithering may be performed additionally or alternatively through the use a fixed mask of thresholds, such that error propagation to neighboring LEDs is not used. The mask for temporal dithering may be stored in and retrieved from an image processing memory 350.

In particular embodiments, spatial dithering and temporal dithering techniques may both be used for one or more µLED array positions at once. For example, when determining the color value to be displayed, the image processing block 345 may receive error values from neighboring µLED positions as well as from previous sub-frames. When propagating errors, the image processing block 345 may reserve some portion of the propagation for spatial dithering and may reserve some portion of the propagation for temporal dithering. Continuing the above example, of the error value 0.0625, a portion may be distributed to neighboring µLEDs for the µLED position (e.g., 0.005 for each µLED of eight µLEDs) and a portion may be reserved for temporal dithering for the same µLED position (e.g., 0.0225).

Another example assumption that may be made by the rendering engine 300 and/or warp engine 310 may be that the display system 320 uses an ideal display, e.g., it has no imperfections. That is, the rendering engine 300 may simply provide a uniform array of pixel color values under the assumption that the display system 320 will output the same uniform array (and that the resulting image will appear the same). In particular embodiments, this assumption, while useful for the rendering pipeline, may not be satisfied. For example, the display system 320 may exhibit one or more imperfections or non-uniformities, including malfunctioning µLEDs, a non-uniform µLED array, multi-primary rendering requirements, and many others. As described below, the image processing block 345 (or pan logic block 335, where needed) may be configured to correct these imperfections and non-uniformities without blurring or otherwise distorting the sub-frame image.

In particular embodiments, some types of non-uniformities may be corrected by the warp engine 310 while some types of non-uniformities may be corrected by the image processing block 345 (or pan logic block 335). Non-uniformities that are expected to have low variation between sub-frames (e.g., low inter-sub-frame variation) may be corrected by the warp engine 310 at a first frame rate. For example, non-uniformities introduced by optics associated with the waveguide or light emitting components of a display may be corrected by the warp engine 310. Because these non-uniformities may be consistently measured regardless of the specified pixel color values of the frame, they may be corrected by the more powerful, but lower frame rate, components of the warp engine 310. Other non-uniformities may be expected to cause high variation between sub-frames (e.g., high inter-sub-frame variation). Non-uniformities of this type may be corrected by modifications applied from sub-frame to sub-frame at a higher frame rate. For example, non-uniformities introduced by malfunctioning µLEDs of the µLED array may be corrected by the image processing block 345. As described below, in some conditions, these values may require correction in between sub-frames (e.g., 10 kHz) and must be rapidly corrected.

A μLED array used in the display system 320 may include one or more malfunctioning μLEDs. For example, one or more μLEDs in a μLED array may be improperly manufactured or may become damaged as part of the assembly process. This may cause the μLED to fail to emit light at a required brightness, fail to emit light corresponding to certain colors, or even fail to emit light at all (resulting in the so-called "dead pixel.") in response to a driving current. In a conventional display, such a result could dramatically reduce the display's value. Another example non-uniformity that may result from a manufacturing process includes relative color values. Even if individual μLEDs may emit light appropriately, one or more neighboring LEDs may fail to emit light of the same wavelength despite instructions to output the same color. This color non-uniformity may, for example, cause the display to appear uneven or blotchy, for example displaying a number of different "reds" despite the intentions of the image's creator for a solid, uniform field. Display uniformity may also change through use, as μLEDs may shift, or become otherwise affected by heat and time of use.

μLED characterization and calibration methods may be used to determine the nature and position of malfunctioning μLEDs within the display system 320. For example, after manufacture, but before assembly, the μLED array may be tested. The position of malfunctioning LEDs and the nature of their underperformance for the display system 320 may be recorded for later use by the display system 320. In particular embodiments, a memory 350 for the image processing block 345 may be set aside for storing this information. The image processing memory 350 may also be referred to as a non-uniformity correction information buffer. The display system 320 may be tested as part of a first-time use or startup configuration perform with each use. The testing and calibration may detect the non-uniformities discussed above (e.g., dead μLEDs, uneven relative color values of neighboring μLEDs).

After a malfunctioning μLED is identified, functions may be engaged to correct the non-uniformities. For example, to improve resolution or to mitigate defects of individual μLEDs within the μLED array, the display system 320 may include an actuation system that produces changes in relative position and/or angle between the μLED array or arrays and the waveguide. However, this approach may require high-performance, high-precision mechanical components. These components may introduce defects of their own, or may simply break with use. In particular embodiments, the location of pixel colors may be shifted between two or more μLEDs on the μLED array. Thus, as described below a single μLED array may act as multiple μLED arrays or may obscure the defects or limitations in the μLED array. These shifting operations may be performed electronically (e.g., using specially configured electronic hardware) or programmatically. Thus, the described systems and methods may reduce manufacture cost and device complexity when compared to a purely mechanical variation.

The image processing block 345 may modify sub-frames to correct for the malfunction (and the resulting display non-uniformity). For example, the image processing block 345 may determine an offset for the error correction and propagation methods (e.g., for malfunctioning μLEDs). In particular embodiments, the display system 320 may create interstitial sub-frames to be inserted near any malfunctioning μLEDs in a μLED array. For example, if a μLED at position (x, y) of the μLED array is determined to be malfunctioning, a interstitial sub-frame may be inserted to cause one or more neighboring μLEDs to emit color to correct for the missing color component.

In particular embodiments, a global rapid sub-frame translation may be calculated to cause the image to shift repeatedly for each subsequent sub-frame. Thus, the color value associated with the malfunctioning μLED may be shared between one or more μLEDs over the course of the many sub-frames provided for each frame. As described above, the viewer's eye may integrate the rapid movements of the up-sampled frames for each frame, and in particular may integrate the pixel colors around each shifted location of a malfunctioning μLED to generate an average color for that area of the frame. In some embodiments, the average color may match the average color produced by two or more μLEDs proximate to the malfunctioning μLED. Thus, by rapidly and repeatedly translating the sub-frames of the frame, the display system 320 may mask malfunctioning μLEDs of the μLED array 360 such that they are not perceived by the viewer, without requiring additional hardware or costly hardware replacements. A global rapid sub-frame translation may have additional benefits with respective to calculation complexity. Because the global sub-frame translation affects all μLEDs in the array, the image processing block 345 may not require perfect information for the location and nature of malfunctioning pixels. It must merely know the largest block of contiguous malfunctioning μLEDs (e.g., two horizontally neighboring μLEDs, a square of four μLEDs). The image processing block 345 may correct all malfunctioning μLEDs at once. Thus, if additional pixel malfunctions develop, the image processing block 345 may correct for them automatically.

In particular embodiments, the global sub-frame translation could be coupled to a mechanical component of a display. For example, the display may include a mechanism to mechanically diffuse the image (e.g., by rapidly vibrating an optics component of a display system or a display component of the display system). This may cause a decrease in the perceived resolution. The global sub-frame translation may be keyed to reduce or eliminate this effect while maintaining the benefits of the image diffuser. For example, to display an image to a user, a computing system may access a first rendered frame generated at a first frame rate (e.g., 30-60 Hz or 100-200 Hz). The first frame rate may be limited by the rendering capabilities of hardware that will render the first rendered frame. The first frame rate may be limited by a communication latency between rendering hardware and the display system, especially when the rendering hardware is a separate computing device from the display system. As described above, the display system or a computing device associated with the display system may generate one or more sub-frames based on the first rendered frame. The sub-frames may be generated at a second frame rate (e.g., up to 10 kHz) that is higher than the first frame rate. After a specified period of time or after a specified number of sub-frames have been generated from the first rendered frame, a second rendered frame may be accessed and used to generate additional sub-frames.

The sub-frames may be generated to counteract displacement caused by the mechanism to mechanically diffuse (e.g., vibrate or shake) the image. In particular, a computing system may determine a displacement measure associated with anticipated or measured movement of a component of the display system. The component may be any suitable component of the display system, such as an optics component associated with an optics system or a display component. The displacement measure may be directly provided to the computing system prior to the displacement occurring (e.g., the diffuser may report the next displacement). The computing system may determine the displacement measure after the displacement has already occurred. The displacement may be any kind of displacement, for example a one- or two-dimensional translation in a plane, a three-dimensional displacement of the component in space, or a warping of the component (e.g., where a point on the component is displaced differently from a second point on the same component). For example, the displacement measure may indicate that the displaced component moved a given distance or magnitude (e.g., 2 pixels or 1 millimeter) in a given direction (e.g., left relative to the viewer or backwards).

Figure 5:
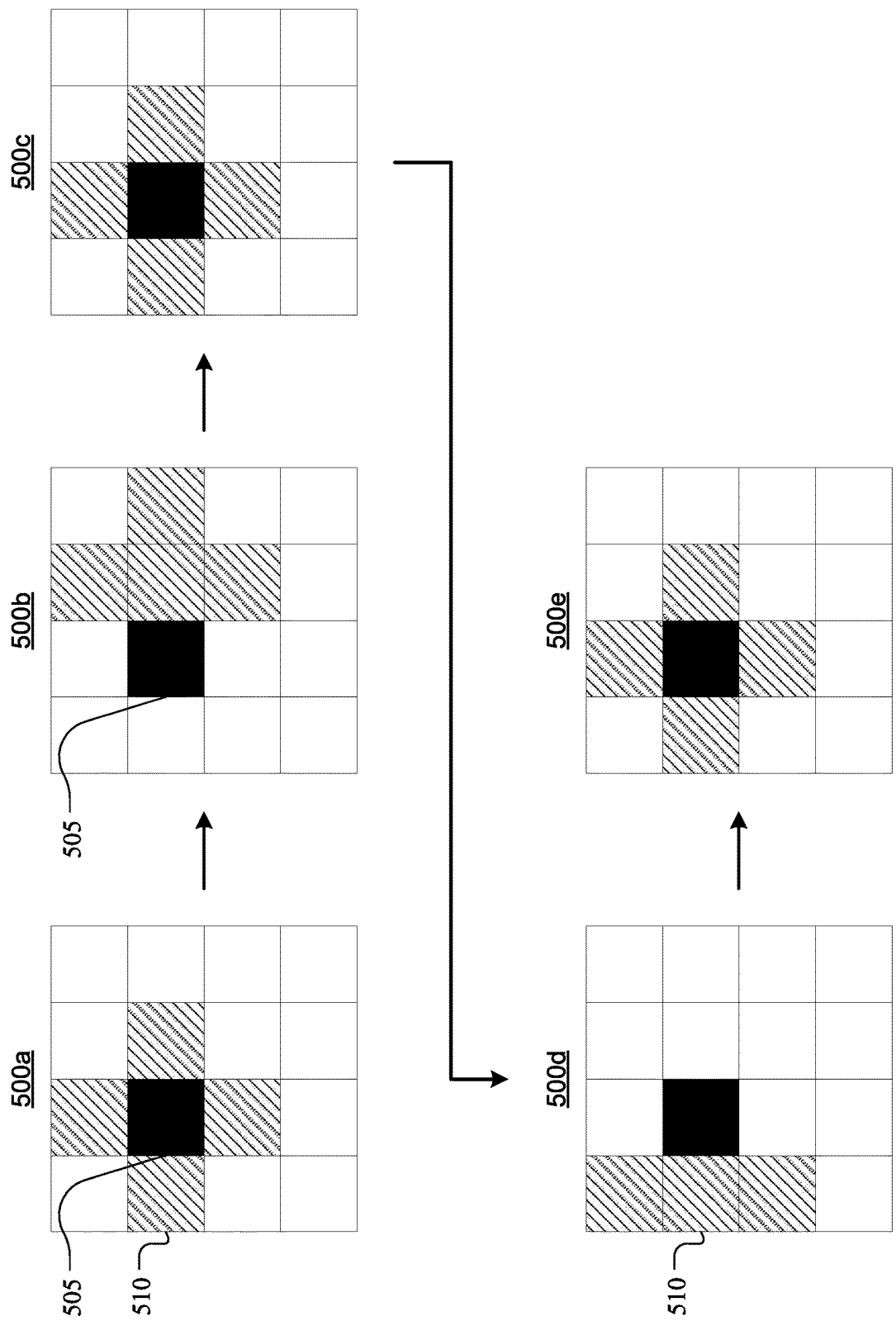
FIG. 5 illustrates an example pixel-shifting operation.

The displacement measure may be used to determine and apply a transformation to the first rendered frame to generate the sub-frame. The transformation may be applied to the first rendered frame such that the result is the sub-frame. During this process the first rendered frame may remain the same (e.g., the same base image may be used for each sub-frame). The transformation may be determined and applied in accordance with the techniques and by the components of the display system described herein (e.g., by the pan logic block). The transformation may include an electronic shift related to or inversely proportional to the magnitude and direction of the displacement. The transformation may include a geometric warp of the first rendered frame. The transformation may comprise a modification of one or more colors of the first rendered frame or one or more color channels of the first rendered frame. The transformation may be further determined based on a first and or second viewing direction of the user at a first and second time. The transformation may be further determined based on the location of one or more malfunctioning light emitters of the display system, detected as described herein. The effect of the transformation may be that the viewer is not aware of differences in the image or in perception of the image of the first rendered frame that may otherwise be caused by the anticipated movement of the display component (e.g., the image is not blurred by the mechanical diffuser). In this way, the process may be used to obscure malfunctioning light emitters (e.g., µLEDs) in a display system using global sub-frame translations and a mechanical diffuser. FIG. 5 illustrates an example of global sub-frame translations to cover a malfunctioning µLED. The µLED array 500a has been provided instructions to emit a cross pattern 310. However, µLED array 500a includes a malfunctioning µLED 505 at the center of the cross pattern 310. The image processing block 345 may retrieve location information about the µLED array 510 that indicates the location of the malfunctioning µLED 505. Accordingly, the image processing block 345 may generate a series of instructions to cause subsequent sub-frames of the frame containing the cross pattern 510 to shift rapidly. µLED array 500b illustrates the next sub-frame to follow the sub-frame shown in µLED 500a. In µLED array 500b, the center of the cross pattern 510 has been shifted one µLED to the right, allowing the center of the cross pattern 510 to be displayed by a non-malfunctioning µLED. In µLED array 500c, showing the next sub-frame after the sub-frame shown by µLED array 500b, the cross pattern 510 has been returned to its original position. In µLED array 500d the cross pattern 510 has been shifted one µLED to the left, distributing the center of the cross pattern 510 among varying neighbor µLEDs to the malfunctioning µLED. In µLED array 500e, showing the next sub-frame after the sub-frame shown in µLED array 500d, the cross pattern has again been returned to its original position. Thus, µLED arrays 500a-500e show five sequential sub-frames, and the effect of a global translation to obscure a malfunctioning µLED. Other translation patterns may be used, including, for example vertical shifts, circular shifts, any other suitable pattern or any combination thereof. As described throughout, the effect, due to the fast frame display rate (e.g., ~10 kHz) may be that the final image is smoothly integrated by the viewer's eye such that no rapid motion is detected and the missing color from the malfunctioning µLED is not noticed.

Figure 6:
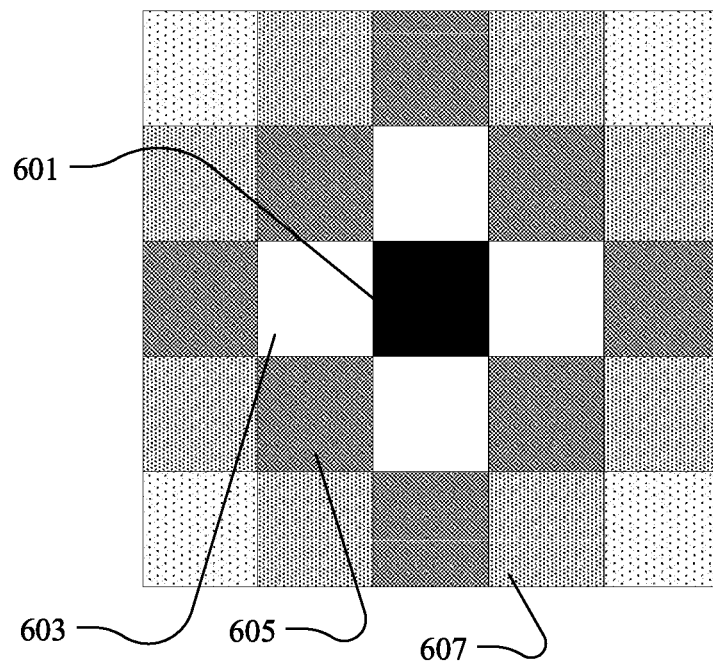
FIG. 6 illustrates an example pixel mask.

In particular embodiments, the pixel values near the malfunctioning µLED may be modified. As an example, a mask of a fixed size may be centered on the malfunctioning µLED. The values of the mask (e.g., a 5×5 pixel mask) may be multiplied with the existing pixel values corresponding to the position of the pixel in the mask. The mask values may be calculated to correspond to the point-spread function of the eye. FIG. 6 illustrates an example pixel mask 600. The colors of the pixel mask 600 may correspond to values that may be used to modify the brightness or color of existing pixel values when the values of the mask are multiplied against the pixel values. The center of the mask 601 may correspond to the malfunctioning µLED. The first ring of pixels adjacent to the mask (e.g., pixel 603) may have little to no dimming applied, or perhaps even have the color or brightness intensified. The next ring of pixels (e.g., pixel 605) may be dimmed, causing the first ring of pixels (e.g., pixel 603) to appear brightened—possibly to obscure the malfunctioning µLED. As the "rings" of pixels move out from the center, the intensity of the pixel value diminishes, so that the next ring of pixels (e.g., pixel 607) may be further dimmed.

As another example, the image processing block 345 may instruct a particular sub-frame to be provided to the µLED array 360 for a longer period of "on-time." This may cause the perceived brightness of the sub-frame to be greater than other sub-frames of that frame. This dithering technique may be combined with color-specific sub-frames or other techniques to boost the appearance of certain colors without requiring increased brightness (and power draw) from the µLEDs. In particular embodiments, the image processing block 345 may cause individual µLEDs to have an increased brightness as a result of, e.g., malfunctioning µLEDs. For example, the image processing block 345 may retrieve data from the image processing memory 350 that indicates a particular µLED is malfunctioning. The image processing block 345 may cause the brightness of one or more of the µLEDs surrounding that µLED (e.g., the nearest neighbor µLEDs) to be greater. This may obscure the malfunctioning µLED by compensating for the reduced brightness in that area of the image. The result may be a minimal increase in power consumption (e.g., increasing the brightness of only a few µLEDs), but a display system 320 that effectively masks the malfunctioning µLED. A similar technique may be applied to compensate for poor individual color performance (e.g., if a particular µLED is unable to emit a blue color channel as bright as surrounding µLEDs).

In particular embodiments, the color channels produced by the µLED array may differ from the primary colors of each frame received from the warp engine 310 (e.g., the "red" provided by the display may not match the "red" required by the pixel color received from the warp engine 310). Furthermore, the µLEDs used in the display system 320 may incorporate different or additional colors than that specified by the color format received from the warp engine 310. For example, the warp engine 310 may specify colors in an RGB/A format, while the µLEDs are configured to use a CMYK format. As another example, the µLEDs may include an arbitrary number of additional and varied primary colors—using two "green" colors or an extra white μLED to increase brightness. As an example, the difference of primary colors used may result from compression used by the compression block 319 of the warp engine 310 or the decompression that may be performed by the decompression block 330 of the display system 320. As another example, the conversion may be performed while reading the pixel color values from the frame buffer 325. The image processing block 345 may convert the primary colors of each received sub-frame into the color channels required by the display system 320. Additional display inconsistencies may also exist, for example, the color channels of each μLED used in the display system 320 may vary based on the amount of driving current provided to the μLED. Thus, the color of a red pixel may change as the intensity of the emitted light increases. The image processing block 345 may calculate a compensation based on this information (which may be stored as a result of μLED characterization testing) and may perform additional dithering (temporal or spatial) to correct it.

Other display non-uniformities may be intentional. The display system 320 may accommodate expected non-uniformities, correcting through a software-based approach what would be difficult to reliably correct at a large scale in hardware. For example, in various embodiments, μLEDs in an array may be associated with a specific color (e.g., an array of red μLEDs), with the display system 320 comprising multiple arrays layer together. The layouts for the μLEDs for each color may be arranged based on one or more convenient shapes. For example, red μLEDs may be arranged based on a first shape, blue μLEDs, may be arranged based on a second shape, and green μLEDs may be arranged based on a third shape. Each color μLED may be arranged in one or more space-filling shapes, such as, for example, and not by way of limitation, squares, hexagons, triangles, trapezoids, or any other suitable space-filling shape. In addition, the origin or spacing of the layout may differ according to the color of the μLED. For example, red μLEDs and blue μLEDs may be arranged based on the same shape but may be offset by half the width of a single μLED to more evenly cover the display area. Thus, the color position output from the display system 320 will not perfectly match the color position specified by the frame data. The image processing block 345 (or pan logic block 335) may calculate and apply a shift required for each μLED array and sub-frame displayed with that array.

In addition, the pan logic block 335 may determine a number of pixels to pan each color frame based on the display geometry of the particular set of μLEDs. For example, for μLEDs corresponding to a hexagonal geometry, the pan logic block 335 may shift the frame by a first number of pixels, while for μLEDs arranged in a square geometry, the pan logic block 335 may shift the frame by a second number of pixels. The information required to perform this operation quickly may be stored in a pan logic buffer, or may be stored and retrieved by the pan logic block 335 from the non-uniformities correction information buffer.

Additionally, or alternatively, two or more μLEDs may correspond to one pixel of a frame, while the specified image may assume only a single μLED will be associated with each pixel. Thus, when a frame is provided to the display system 320, the display system 320 may translate each pixel of the frame to instructions for one or more μLEDs. Accordingly, the image processing block 345 may control the intensity of each μLED corresponding to a pixel in order to resolve finer color gradations.

In particular embodiments, the driving current supplied to each μLED may be analog or digital. In embodiments in which an analog current is used, the emission color of a μLED may vary based on small differences between the amount of current supplied. Accordingly, the image processing block 345 may determine a color offset between the output color required by the frame received from the warp engine 310 or rendering engine 300 and the expected emission color of the μLED based on the available supply current. The image processing block 345 may further adjust the current supply and/or apply spatial or temporal dithering globally or for the specific μLED to compensate for a computed color offset. With respect to digital signals, the image processing block 345 may compute a color offset between the color gradation produced by the μLED at a range of expected input currents and the color of the pixel associated with the μLED in the received frame. The image processing block 345 may further compensate for the computed color offset by performing spatial and/or temporal dithering of one or more subsequent frames.

In particular embodiments, the rendering pipeline may implement a rolling buffer for outputting rendered frames for display to a user. For example, and not by way of limitation, the rolling buffer may display frames on a per primary color basis. Each μLED may display one primary color (e.g., red, blue, yellow) and each frame may be composited from one or more primary color frames. The pan logic block 335 may transfer one or more sub-frames to the image processing block 345 that each correspond to one primary display colors (e.g., a red sub-frame, a blue sub-frame, a yellow sub-frame, etc.) with varying brightness levels across the sub-frames to account for color differences.

The sub-frames may be provided to their associated μLEDs on a per-color basis, in a particular time-based order. This may be referred to as "time-sequential rendering". For example, a red sub-frame may be rendered first (i.e., by supplying current to μLEDs corresponding to red light), followed by a blue sub-frame (i.e., by supplying current to μLEDs corresponding to blue light), and lastly by a green sub-frame. Because of the high frame rate of the display system 320, the user's eye may integrate these separate color frames into a composite image. Thus, time-sequential rendering may be similar to providing color in newsprint, where, instead of primary colors presented in clusters to achieve a mixed-color effect, the primary colors are clustered in terms of time. In various embodiments, the image processing block 345 may add, remove, and/or adjust the color of a received sub-frame from the pan logic block 335 to compensate for color distortions in the display system 320, or perform any of the operations discussed throughout to ensure that the proper colors are presented to the μLEDs.

In particular embodiments, the frame rate associated with each primary color sub-frame may vary. For example, a red sub-frame may be rendered more or less frequently than a blue sub-frame, based on, for example, manufacturing differences between the different μLEDs or μLED arrays, properties of the μLEDs or the light they produce (for example, blue light may be more easily perceived than red light, and be emitted less frequently for the frame).

Furthermore, a rolling buffer display system 320 may render frames in a segmented manner. For example, the display system 320 may render frames by dividing the frame into spatial segments, such as by line, by column, by pixel, by frame segment or tile, and so forth. The display system 320 may cause the μLEDs associated with the particular segment to emit light for only particular portion of the spatial segment, displaying a portion of the image for a sub-frame. The displayed spatial segment may be removed (e.g., the μLEDs powered off) before or after displaying a successive neighboring spatial segment. In addition, or alternatively, the display system 320 may output all spatial segments of color-segmented and spatial-segmented sub-frames on a per color basis before moving to the next color. The display system 320 may interweave colors or segments in a pattern determined to be most efficient. Segmenting display requirements (based on color or screen position) may be desirable to reduce the power load and workload of the μLEDs and supporting circuitry, it may also reduce the current requirements, allowing a less expensive power supply to be used (e.g., one that is more efficient or supplies a lower amperage).

In various embodiments, rendering a frame segment by segment may produce visual artifacts (e.g., the rolling shutter effect). For example, if a first horizontal segment is displayed, followed by a second horizontal segment below the first, and the viewer has moved, the image (created by the combined horizontal segments) will appear to smear (e.g., skew, shear, or compress). However, this effect is predictable, based on the known rolling shutter rate and the viewer's movements, which, as discussed above, may be recorded and provided to the pan logic block 335. Accordingly, the pan logic block 335 may adjust each portion of the sub-frame spatial segment to correct for movement of the user's head or eyes between display of each sub-frame spatial segment. Similarly, the pan logic block 335 may adjust each spatial segment to correct for movement of the user's head or eyes between output of different colors of each sub-frame spatial segment. In particular embodiments, similar techniques may be used to harmonize the output of a single image (frame or sub-frame) across multiple μLED arrays, wherein the pan logic block 335 of the display system 320 may be in communication with one another to reduce the appearance of artifacts between the multiple μLED arrays. This may be used in addition to other stitching techniques to minimize apparent artifacts between the multiple μLED arrays.

In particular embodiments, the pan logic block 335 may use a threshold movement speed to determine whether such a sub-frame segment translation is needed. Because the display rate of up-sampled sub-frames exceeds the speed of most user eye movements, the sub-frame segment translation to correct the movement between display of sub-frame segments may not be required in all instances. The pan logic block 335 (or any other suitable component) may detect whether the speed of the eye movement is greater than a threshold speed, and use this information to initiate a process to determine the needed adjustment of sub-frame segments while that movement persists.

Figure 7:
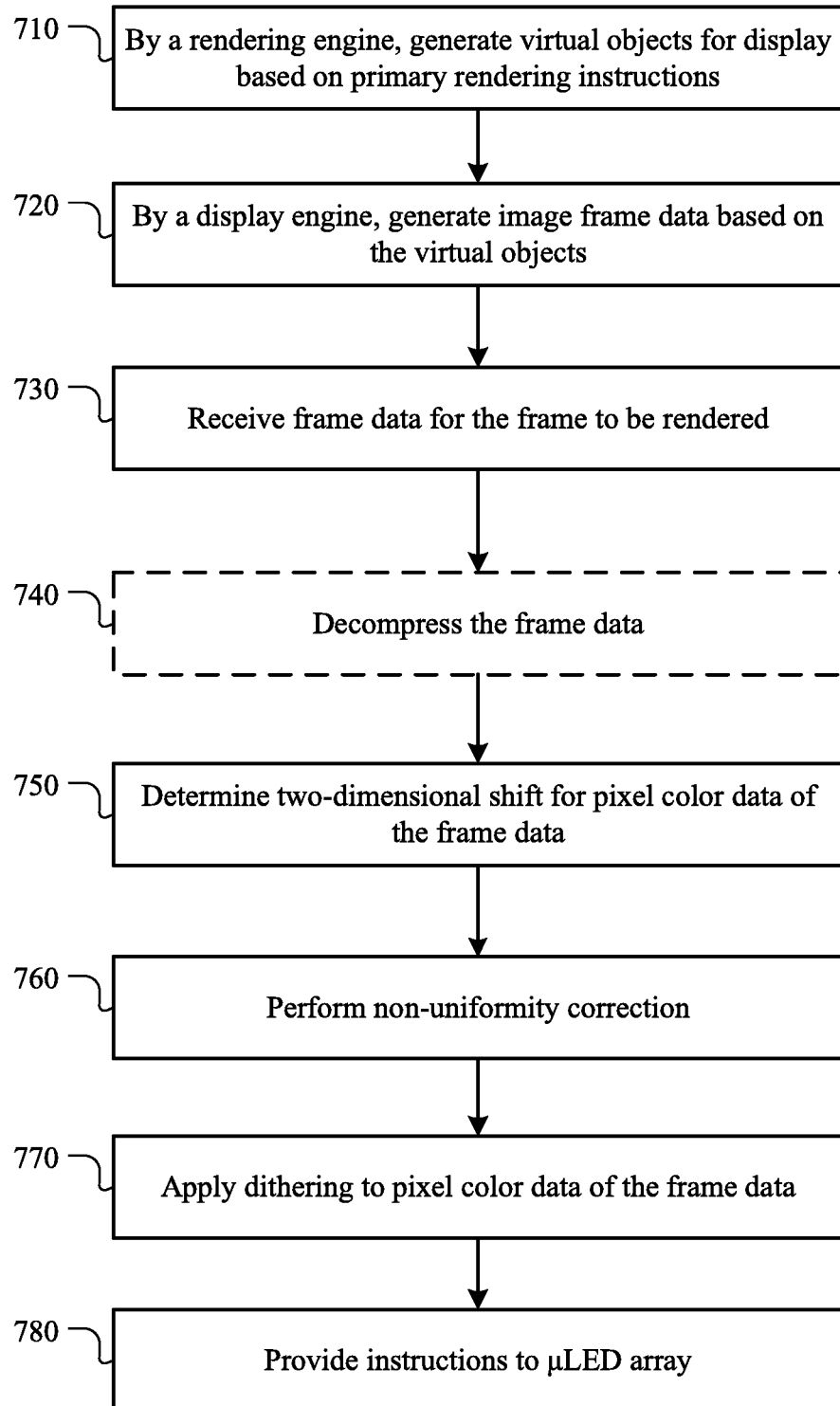
FIG. 7 illustrates an example method for generating and displaying modified sub-frames.

FIG. 7 illustrates an example method 700 for generating and displaying modified sub-frames. The method may begin at step 710, where a rendering engine 300 may generate virtual objects for display based on primary rendering instructions. As described above, the primary rendering instructions may include a set of polygons and associated colors for display. The rendering engine 300 may perform initial visibility determinations based on information regarding the location of the viewer with respect to a virtual scene. The rendering engine 300 may produce specialized object primitives, such as the above described surfaces, for use by the warp engine 310. The surfaces may comprise 2D images representing a 3D virtual scene. The rendering engine 300 may provide the surfaces to a warp engine 310 at a rate of, e.g., 30-60 Hz. At step 720, a warp engine 310 may generate image frame data for the frame to be rendered based on virtual objects (e.g., surfaces) received from the rendering engine 310. The warp engine 310 may perform visibility determinations for the surfaces based on the location of a user's view into the virtual scene, calculate and apply one or more geometric warps, perform color interpolation and brightness corrections, and otherwise prepare the image frame data to be sent to the display system 320. The warp engine 310 may provide the image frame data to the display system 320 at a rate of e.g., 100-200 Hz. In particular embodiments, the virtual objects prepared by the rendering engine 300 may be configured to be receivable by the display system 320 directly, and the warp engine 310 may not be required.

At step 730, frame data is received by a display system 320. For example, pixel color values and corresponding position information (e.g., in a bitmap file format) may be received by a frame buffer 325 of a display system. At step 740, a decompression block 330 of the display system 320 may decompress the frame data if the frame data had been compressed. At step 750, a pan logic block 335 of the display system 320 may calculate and apply one or more global one- or two-dimensional color value position shifts for the frame data based on user movement detected since the image frame data had been received. At step 760, the image processing block 345 of the display system 320 may calculate and apply one or more non-uniformity corrections for the frame data. At step 770, an image processing block 345 of the display system 320 may calculate and apply one or more dithering operations, including one- or two-dimensional spatial dithering or temporal-spatial dithering. For example, the image processing block 345 may calculate a color depth precision error for one or more μLEDs of a μLED array 360 of the display system 320. The image processing block 345 may propagate the color depth precision error to one or more neighboring μLEDs and/or to one or more future sub-frames of the frame. At step 780, a PWM driver 355 of the display system 320 may provide display instructions for the μLEDs of the μLED array 360 of the display system 320.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for up-sampling display frames including the particular steps of the method of FIG. 7, this disclosure contemplates any suitable method for up-sampling display frames including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
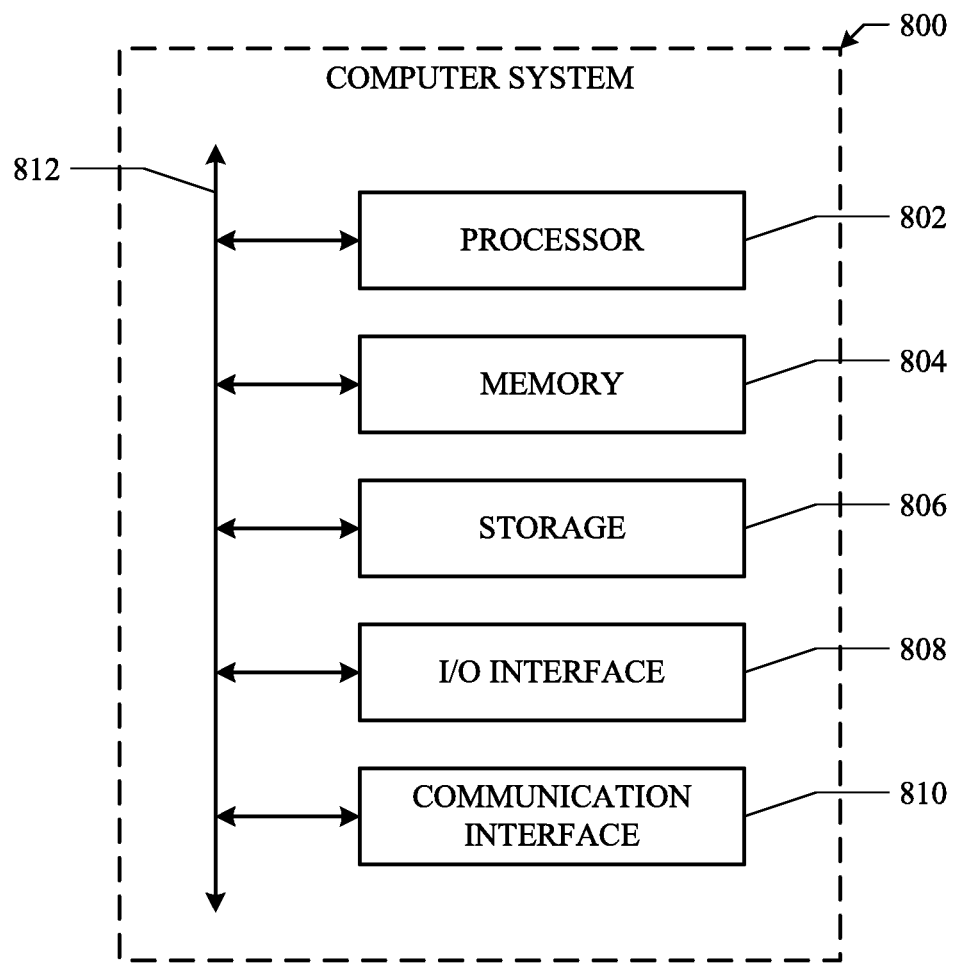
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What we claim is:

1. A method comprising, by a computing device comprising a display that operates in a display cycle comprising a plurality of on-cycles of the display cycle and a plurality of off-cycles of the display cycle:

accessing a first rendered frame generated based on a first viewing direction of a user, the first rendered frame being generated at a first frame rate and while the display is in a first off-cycle of the display cycle;

generating, based on the first rendered frame and while the display is in a first on-cycle of the display cycle, one or more sub-frames at a second frame rate that is higher than the first frame rate, wherein a first sub-frame of the one or more sub-frames is generated by:
   determining a second viewing direction of the user based on sensor data; and
   applying one or more transformations to the first rendered frame based on the second viewing direction; and
outputting the one or more sub-frames for display at the second frame rate.

2. The method of claim 1, further comprising:
accessing a second rendered frame generated at the first frame rate after outputting a threshold number of the one or more sub-frames for display.

3. The method of claim 1, further comprising:
generating the first rendered frame by:
   receiving data regarding an image to be rendered; and
   applying one or more geometric warp transformations to the image data based on the first viewing direction of the user.

4. The method of claim 1, wherein the display cycle of the display comprises a duty cycle of one or more light emitters of the display.

5. The method of claim 1, wherein applying one or more transformations to the first frame based on the second viewing direction further comprises:
   determining a difference between the first viewing direction and the second viewing direction related to a user eye movement the user; and
   electronically shifting the first rendered frame based on the difference related to the user eye movement.

6. The method of claim 5, wherein the electronically shifting the first rendered frame is inversely proportional to the user eye movement.

7. The method of claim 1, wherein applying one or more transformations to the first rendered frame further comprises:
   determining a scanline refresh rate of the display; and
   translating the first rendered frame based on the scanline refresh rate.

8. The method of claim 1, further comprising:
   dithering the first sub-frame based on a color error calculated for each pixel of the first sub-frame, wherein the color error reflects a difference between a color precision of the display and a specified color of the pixel.

9. The method of claim 8, wherein the color error is calculated based in part on one or more second pixels near each pixel of the display.

10. The method of claim 8, wherein the color error for a pixel at a first location in the display is calculated based in part on a color output at the first location in the display in a previous sub-frame.

11. The method of claim 1, further comprising:
   determining one or more non-uniformities in the display; and
   during generation of the first sub-frame, applying a transformation to the first rendered frame to correct the non-uniformities in the display.

12. The method of claim 11, further comprising:
   determining one or more non-uniformities in an optics component of the display; and
   prior to accessing the first rendered frame, applying a transformation to the first rendered frame to correct the non-uniformities in the optics component of the display.

13. The method of claim 1, further comprising:
   determining non-uniformities in the display or in an optics component of the display;
   categorizing the non-uniformities as causing high inter-sub-frame variation or as causing low inter-sub-frame variation;
   applying a transformation to the first rendered frame to correct non-uniformities categorized as causing low inter-sub-frame variation; and
   during generation of the first sub-frame, applying a transformation to the first rendered frame to correct non-uniformities categorized as causing high inter-sub-frame variation.

14. The method of claim 1, wherein generating one or more sub-frames at the second frame rate further comprises:
   associating a first sub-frame of the one or more sub-frames with a first color channel, such that the first sub-frame comprises a plurality of intensities of the first color channel; and
   associating a second sub-frame of the one or more sub-frames with a second color channel, such that the second sub-frame comprises a plurality of intensities of the second color channel, wherein the second color channel is distinct from the first color channel.

15. The method of claim 1, wherein the first rendered frame is generated by a different computing device than the one or more sub-frames.

16. The method of claim 1, wherein the computing device that generated the one or more sub-frames is a component of a display system that comprises the display by which the one or more sub-frames are output.

17. A system comprising:
one or more processors;
a display that operates in a display cycle comprising a plurality of on-cycles of the display cycle and a plurality of off-cycles of the display cycle; and
one or more computer-readable non-transitory storage media coupled to one or more of the processors and comprising instructions operable when executed by one or more of the processors to cause the system to:
access a first rendered frame generated based on a first viewing direction of a user, the first rendered frame being generated at a first frame rate and while the display is in a first off-cycle of the display cycle;
generate, based on the first rendered frame and while the display is in a first on-cycle of the display cycle, one or more sub-frames at a second frame rate that is higher than the first frame rate, wherein a first sub-frame of the one or more sub-frames is generated by:
   determining a second viewing direction of the user based on sensor data; and
   applying one or more transformations to the first rendered frame based on the second viewing direction; and
output the one or more sub-frames for display at the second frame rate.

18. The system of claim 17, wherein the instructions are further operable when executed by one or more of the processors to cause the system to:
access a second rendered frame generated at the first frame rate after a threshold number of the one or more sub-frames are output for display.

19. One or more computer-readable non-transitory storage media embodying software that is operable when executed to:
- access a first rendered frame generated based on a first viewing direction of a user, the first rendered frame being generated at a first frame rate and while a display that operates in a display cycle comprising a plurality of on-cycles of the display cycle and a plurality of off-cycles of the display cycle is in a first off-cycle of the display cycle;
- generate, based on the first rendered frame and while the display is in a first on-cycle of the display cycle, one or more sub-frames at a second frame rate that is higher than the rendered first frame rate, wherein a first sub-frame of the one or more sub-frames is generated by:
  - determining a second viewing direction of the user based on sensor data; and
  - applying one or more transformations to the first frame based on the second viewing direction; and
- output the one or more sub-frames for display at the second frame rate.

20. The computer-readable non-transitory storage media of claim 19, wherein the software is further operable when to:
- access a second rendered frame generated at the first frame rate after a threshold number of the one or more sub-frames are output for display.

* * * * *